US008165064B2

(12) United States Patent
Mukkavilli et al.

(10) Patent No.: US 8,165,064 B2
(45) Date of Patent: Apr. 24, 2012

(54) ENHANCEMENTS TO THE POSITIONING PILOT CHANNEL

(75) Inventors: Krishna Kiran Mukkavilli, San Diego, CA (US); Ashok Mantravadi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 908 days.

(21) Appl. No.: 12/165,653

(22) Filed: Jul. 1, 2008

(65) Prior Publication Data

US 2009/0190525 A1 Jul. 30, 2009

Related U.S. Application Data

(60) Provisional application No. 61/030,178, filed on Feb. 20, 2008, provisional application No. 61/024,143, filed on Jan. 28, 2008.

(51) Int. Cl.
*H04W 4/00* (2009.01)

(52) U.S. Cl. ........................................ 370/328; 370/349

(58) Field of Classification Search .................. 370/349, 370/310, 310.2, 328, 203, 208, 338, 332; 455/456.1, 456.6
See application file for complete search history.

(56) References Cited

U.S. PATENT DOCUMENTS 4,252,995 A 2/1981 Schmidt et al.
4,481,658 A 11/1984 Schmidt
4,493,099 A 1/1985 Schmidt
5,889,474 A 3/1999 LaDue
6,134,267 A * 10/2000 Schafer et al. ................ 375/224
6,208,871 B1 3/2001 Hall et al.
6,246,725 B1 6/2001 Vanzieleghem et al.
6,456,653 B1 9/2002 Sayeed
6,804,223 B2 10/2004 Hoffmann et al.
7,248,559 B2 7/2007 Ma et al.
7,248,880 B2 7/2007 Gheorghiu et al.
7,292,189 B2 11/2007 Orr et al.
7,359,312 B2 4/2008 Riazi et al.

(Continued)

FOREIGN PATENT DOCUMENTS

EP 1 072 900 A2 1/2001

(Continued)

OTHER PUBLICATIONS

International Search Report and Written Opinion—PCT/US2009/032257, International Search Authority, European Patent Office, Aug. 12, 2010.

(Continued)

*Primary Examiner* — Brenda H Pham
(74) *Attorney, Agent, or Firm* — Gerald P. Joyce, III

(57) ABSTRACT

A method for communicating transmitter identification in an interlace structure of a communication network system using positioning pilot channels (PPC), comprising:

a) encoding pilot information on a first portion of a plurality of subcarriers in a positioning pilot channel symbol for an active transmitter; and b) encoding transmitter identification information on a second portion of a plurality of subcarriers of the symbol;

wherein the first portion of the plurality of subcarriers comprises at least first and second interlaces and the second portion of the plurality of subcarriers comprises at least a third interlace;

the pilot information is scrambled in the first interlace with a wide area identifier and scrambled in the at least second interlaces with the wide area identifier and a local area identifier; and wherein at least one of the interlace includes the transmitter identification information in the form of one or more transmitter location coordinates in a free interlace.

43 Claims, 9 Drawing Sheets

U.S. PATENT DOCUMENTS

| | | | |
|---|---|---|---|
| 7,411,896 | B1 | 8/2008 | Karsi |
| 7,433,390 | B2 | 10/2008 | Hepler et al. |
| 7,586,836 | B2 | 9/2009 | Park et al. |
| 7,639,660 | B2 | 12/2009 | Kim et al. |
| 7,706,328 | B2 * | 4/2010 | Mukkavilli et al. ........... 370/332 |
| 2003/0072395 | A1 | 4/2003 | Jia et al. |
| 2003/0076777 | A1 | 4/2003 | Stuber et al. |
| 2003/0162547 | A1 | 8/2003 | McNair |
| 2006/0133388 | A1 | 6/2006 | Wang et al. |
| 2006/0256708 | A1 | 11/2006 | Wang et al. |
| 2006/0291577 | A1 | 12/2006 | Boariu |
| 2007/0036065 | A1 | 2/2007 | Wang |
| 2007/0036066 | A1 | 2/2007 | Thomas et al. |
| 2007/0069953 | A1 | 3/2007 | Ling et al. |
| 2007/0153743 | A1 | 7/2007 | Mukkavilli et al. |
| 2007/0182633 | A1 | 8/2007 | Omura et al. |
| 2008/0008276 | A1 | 1/2008 | Yokoyama |
| 2008/0051147 | A1 | 2/2008 | Kwun et al. |
| 2009/0097396 | A1 | 4/2009 | Xing et al. |
| 2009/0268665 | A1 | 10/2009 | Yousef |
| 2009/0289851 | A1 | 11/2009 | Lommen et al. |
| 2010/0120422 | A1 | 5/2010 | Cheung et al. |
| 2010/0150263 | A1 | 6/2010 | Peake et al. |

FOREIGN PATENT DOCUMENTS

| | | | |
|---|---|---|---|
| EP | 1 087 585 | A2 | 3/2001 |
| EP | 1 785 741 | A1 | 5/2007 |
| TW | 488175 | | 5/2002 |
| TW | 548935 | | 8/2003 |
| TW | 200400737 | | 1/2004 |
| WO | WO 97/47148 | | 12/1997 |
| WO | WO 00/36767 | | 6/2000 |
| WO | WO 01/58195 | A1 | 8/2001 |
| WO | WO03096547 | A1 | 11/2003 |
| WO | WO 2006/039681 | A1 | 4/2006 |
| WO | WO 2006/099326 | A1 | 9/2006 |
| WO | WO 2006/099526 | A2 | 9/2006 |
| WO | WO 2007/038552 | A1 | 4/2007 |
| WO | WO 2007/047502 | A1 | 4/2007 |
| WO | WO 2007/053954 | A1 | 5/2007 |

OTHER PUBLICATIONS

Murali R Chari et al: "FLO Physical Layer: An Overview" IEEE transactions on Broadcasting, vol. 53, No. 1, Mar. 1, 2007, pp. 145-160, XP011172013, IEEE Service Center, Piscataway, NJ, US, Issn: 0018-9316, Abstract; Figs. 8,11,13, Sections IV.C.4), IV.C.8), IV.C.9 Standards, Telecommunications Industry Assoications, Aug. 1, 2006, XP017005609, Arlington, VA, US.

"Forward Link Only Air Interface Specification for Terrestrial Mobile Multimedia Multicast: TIA-1099" EIMIA Standards, Telecomm. Industry Assoc., Aug. 1, 2006, XP017005609, Arlington, VA, Secs. 5.2.1.2..9.2.7, 5.2.1.2.9.2.8, 5.2.1.2.10.

Georgios Gardikis et al: "Broadband multimedia on the move with DVB-H" Multimedia Tools and Applications, vol. 36, No. 1-2, Feb. 10, 2007, pp. 133-144, XP019555264 Kluwer Academic Publishers, BO, NL ISSN: 1573-7721 * abstract * sections 1, 2.

Nagareda R et al: "OFDM mobile packet transmission system with multiuser detection and metric combining ARQ" IEEE Vehicular Technology Conference, vol. 1, Sep. 26, 2004, pp. 709-713, XP010788469 Piscataway, NJ, USA, IEEE ISBN: 978-0-7803-8521-4 * abstract * sectins ILA, ILC, IILA, IILB, IV.A, V.

* cited by examiner

ENHANCEMENTS TO THE POSITIONING PILOT CHANNEL

CLAIM OF PRIORITY UNDER 35 U.S.C. §119

The present Application for Patent claims priority to Provisional Application Ser. No. 61/030,178 filed Feb. 20, 2008, entitled "Enhancements To The Positioning Pilot Channel" and Provisional Application Ser. No. 61/030,178 filed Feb. 20, 2008 and Ser. No. 61/024,143, Filed Jan. 28, 2008, entitled "Enhancements To The Positioning Pilot Channel" assigned to the assignee hereof and hereby expressly incorporated by reference herein.

REFERENCE TO CO-PENDING APPLICATIONS FOR PATENT

The present Application for Patent is related to the following co-pending U.S. Patent Applications:

"Methods and Apparatus for Position Location in a Wireless Network" by Mukkavilli et al., having U.S. Ser. No. 11/517,119, filed Sep. 6, 2006, assigned to the assignee hereof, and expressly incorporated by reference herein.

"Methods and Apparatus for Transmitter Identification in a Wireless Network" by Mukkavilli et al., having U.S. Ser. No. 11/834,654, filed Aug. 6, 2007, assigned to the assignee hereof, and expressly incorporated by reference herein.

BACKGROUND

1. Field

The present application generally relates to the operation of communication systems, and more particularly, to methods and apparatus for transmitting identification information concerning a transmitter in a communication system.

2. Background

In presently known communication systems, such as content delivery/media distribution systems (e.g., Forward Link Only (FLO) or digital video broadcast (DVB-T/H) systems), real time and non real time services are typically packed into transmission frames (e.g., a FLO superframe) and delivered to devices on a network. Additionally, such communication systems may utilize Orthogonal Frequency Division Multiplexing (OFDM) to provide communications between a network server and one or more mobile devices. This communication provides a transmission superframe having data slots that are packed with content to be delivered over a distribution network as a transmit waveform.

It is known to effect transmitter identification and position determination of mobile devices in some wireless networks through the use of positioning pilot channels (PPC) in FLO networks. In particular, known transmitter identification involves determining a channel profile from pilot symbols of an active PPC symbol from each individual transmitter to a receiver. Although the transmitter identity may not explicitly be encoded in the PPC symbols, the identities of transmitters in a given region may be determined as long as a schedule of when transmitters transmit active PPC symbols is known, such as sequencing active transmitters in a pseudo time division multiple access (TDMA) fashion (e.g., the transmitters follows a known time sequence of active transmission where only one transmitter at a time will be active in the given region). Accordingly, it is possible to use the location of an active PPC symbol in a superframe to map transmitters to corresponding PPC symbols with additional use of overhead channels (e.g., overhead information symbols (OIS)) in the superframe. Under this scheme, the periodicity (i.e., scheduling) of the network transmitters in terms of the superframe must be also known by the receivers.

SUMMARY

According to an aspect, a method is disclosed for communicating transmitter identification in a communication system. The method includes encoding pilot information on a first portion of a plurality of subcarriers in a symbol for an active transmitter, and encoding transmitter identification information on a second portion of the plurality of subcarriers of the symbol.

According to another aspect, an apparatus for communicating transmitter identification information in a network is disclosed. The apparatus includes a first module configured to encode pilot information on a first portion of a plurality of subcarriers in a symbol for an active transmitter, and a second module configured to encode transmitter identification information on a second portion of the plurality of subcarriers of the symbol.

According to yet another aspect another apparatus for transmitting transmitter identification information in communication system is disclosed. The apparatus features means for encoding pilot information on a first portion of a plurality of subcarriers in a symbol for an active transmitter, and means for encoding transmitter identification information on a second portion of the plurality of subcarriers of the symbol.

According to still another aspect, a computer program product is disclosed. The computer program product includes a computer-readable medium having code for causing a computer to encode pilot information on a first portion of a plurality of subcarriers in a symbol for an active transmitter, and code for causing a computer to encode transmitter identification information on a second portion of the plurality of subcarriers of the symbol.

In another aspect, at least one processor configured to perform a method for transmitting transmitter identification information in a network is disclosed. The method includes encoding pilot information on a first portion of a plurality of subcarriers in a symbol for an active transmitter, and encoding transmitter identification information on a second portion of the plurality of subcarriers of the symbol.

In yet a further aspect a method for determining transmitter identification information in a device in a communication system is disclosed. The method comprises receiving at least one symbol having a plurality of subcarriers from a transmitter. The method further includes determining a channel estimate and an energy measurement of the at least one symbol from a transmitter using a first portion of the plurality of subcarriers in the at least one symbol, and decoding a dedicated second portion of the plurality of subcarriers in the at least one symbol to determine the transmitter identification information.

According to still another aspect, an apparatus for determining transmitter identification information in a device in a communication system is disclosed. The apparatus includes means for receiving at least one symbol having a plurality of subcarriers from a transmitter, and means for determining a channel estimate and an energy measurement of the at least one symbol from a transmitter using a first portion of the plurality of subcarriers in the at least one symbol. The apparatus further includes means for decoding a dedicated second portion of the plurality of subcarriers in the at least one symbol to determine the transmitter identification information.

In yet one further aspect, a computer program product is disclosed. The computer program product features a computer-readable medium having code for causing a computer to receive at least one symbol having a plurality of subcarriers from a transmitter, and code for causing a computer to determine a channel estimate and an energy measurement of the at least one symbol from a transmitter using a first portion of the plurality of subcarriers in the at least one symbol. The medium also includes code for causing a computer to decode a dedicated second portion of the plurality of subcarriers in the at least one symbol to determine the transmitter identification information.

In still a further aspect, given that transmitter identification information is signaled in the form of transmitter location coordinates (e.g., GPS position coordinates), novel implementations for presenting and sending the transmitter location information is presented herein.

DETAILED DESCRIPTION

Figure 1:
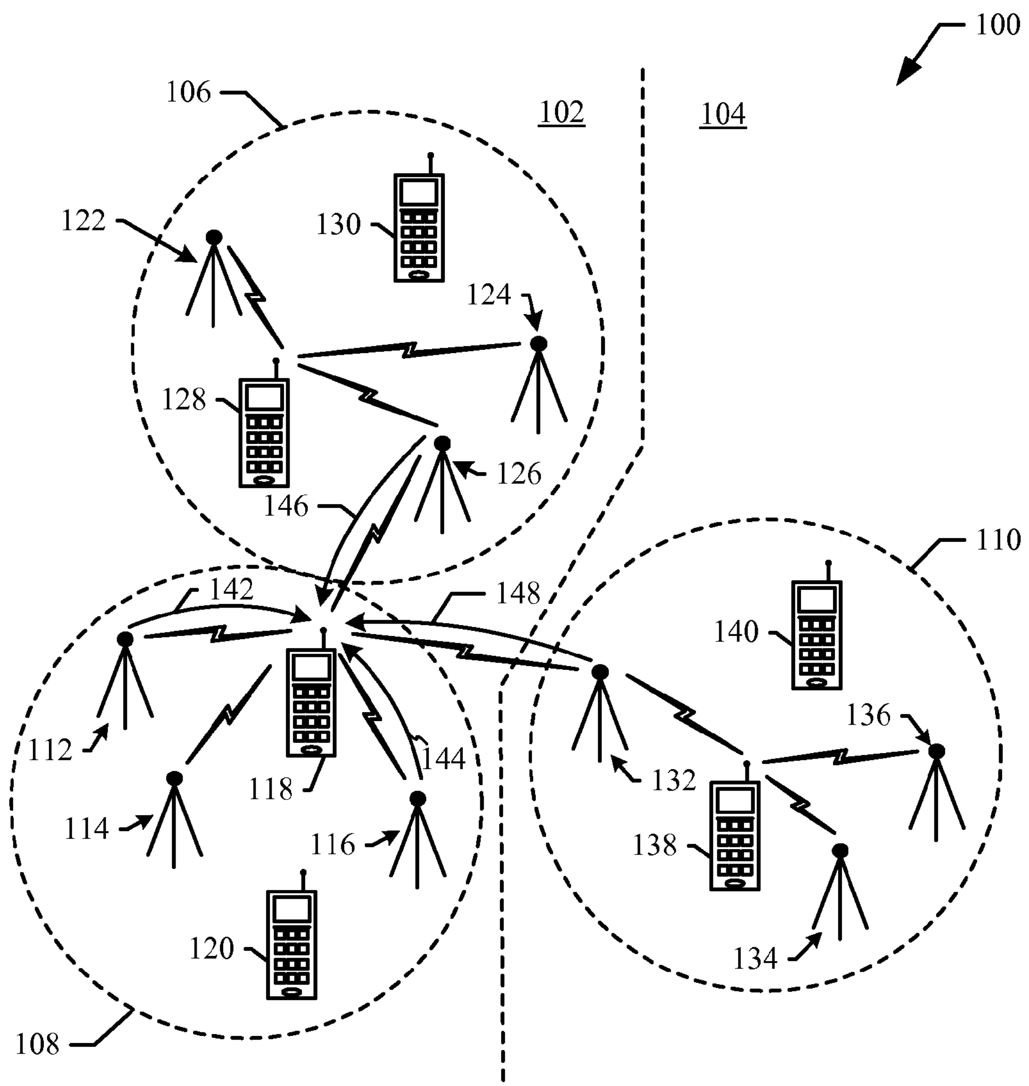
FIG. 1 illustrates a communication network which may employ a disclosed transmitter identification scheme.

The present disclosure relates to methods and apparatus for transmitting identification information concerning a transmitter in a communication system. The methods and apparatus afford a scheme for transmitter identification and position determination using the PPC channels that does not require that scheduling of the transmitters in local network area be known to a receiver. In particular, the disclosed methods and apparatus employ PPC symbols including transmitter identification information, such that a receiver only needs timing information from a superframe and the PPC symbol to determine the identity of an active transmitter. In a particular example, the transmitter identity may be explicitly encoded in the PPC symbols. By explicitly encoding the transmitter identity in the PPC symbols, higher level scheduling information of the network transmitters need not be known at the transmitter. However, the transmitter will have to perform extra processing to embed the transmitter identity information in the PPC symbols in a robust manner and the receiver will have to process PPC symbols to extract the transmitter identity information. The transmitter identification information, however, affords less processing resources needed to be used by the receiver to identify a transmitter and for corresponding position location using channel profiles of identified transmitters. Further, additional information encoded with the identification may signal to receivers whether further symbols are being used by a particular transmitter.

For purposes of this description, a transmitter identification scheme is described herein with reference to a communication network that utilizes Orthogonal Frequency Division Multiplexing (OFDM) to provide communications between network transmitters and one or more mobile devices, such as FLO or DVB-T/H. In an example, the disclosed communication systems may employ the concept of Single Frequency Network (SFN), where the signals from multiple transmitters in the network carry the same content and transmit identical waveforms. As a result, the waveforms can be viewed by a receiver as if they are signals from the same source with different propagation delays.

It is further noted that an exemplary OFDM system disclosed herein may, for example, utilize superframes. The superframes include data symbols that are used to transport services from a server to receiving devices. According to an example, a data slot may be defined as a set of a predetermined number of data symbols (e.g., 500) that occur over one OFDM symbol time. Additionally, an OFDM symbol time in the superframe may carry, as merely an example, eight slots of data.

According to further example, a PPC in a superframe includes PPC symbols that are used to provide transmitter identification information that for channel estimates for individual transmitters in the network to be determined. The individual channel estimates can then be used for both network optimization (transmitter delays for network optimization and power profiling) and position location (through measurement of delays from all nearby transmitters followed by triangulation techniques).

In an exemplary system, the superframe boundaries at all transmitters may be synchronized to a common clock reference. For example, the common clock reference may be obtained from a Global Positioning System (GPS) time reference. A receiving device may then use the PPC symbols to identify a particular transmitter and a channel estimate from a set of transmitters in the vicinity of the receiving device.

FIG. 1 illustrates a communication network 100 in which the presently disclosed methods and apparatus may be employed. The illustrated network 100 includes two wide area regions 102 and 104. Each of the wide area regions 102 and 104 generally covers a large geographical area, such as a state, multiple states, a portion of a country, an entire country, or more than one country. In turn, the wide area regions 102 or 104 may include local area regions (or sub-regions). For example, wide area region 102 includes local area regions 106 and 108 and wide area region 104 includes local area region 110. It is noted that the network 100 illustrates just one network configuration and that other network configurations having any number of wide area and local area regions may be contemplated.

Each of the local area regions 106, 108, 110 include one or more transmitters that provide network coverage to mobile devices (e.g., receivers). For example, the region 108 includes transmitters 112, 114, and 116, which provide network communications to mobile devices 118 and 120. Similarly, region 106 includes transmitters 122, 124, and 126, which provide network communications to devices 128 and 130, and region 110 is shown with transmitters 132, 134, and 136, which provide network communications to devices 138 and 140.

As illustrated in FIG. 1, a receiving device may receive superframe transmissions including PPC symbols from transmitters within its local area, from transmitters in another local area within the same wide area, or from transmitters in a local area outside of its wide area. For example, device 118 may receive superframes from transmitters within its local area 108, as illustrated by arrows 142 and 144. Device 118 may also receive superframes from a transmitter in another local area 106 within wide area 102, as illustrated by arrow 146. Device 118 potentially may further receive superframes from a transmitter in local area 110, which is in another wide area 104, as illustrated at 148.

As was disclosed in the patent application entitled "Methods and Apparatus for Position Location in a Wireless Network" by Mukkavilli et al., having U.S. Ser. No. 11/517,119, filed Sep. 6, 2006, which is expressly incorporated by reference herein, the PPC symbols transmitted by an active transmitter are configured differently that those transmitters that are concurrently idle or dormant with respect to PPC symbol transmission. During operation, network provisioning information is used by each transmitter to determine which transmitter in an area is to become the "active transmitter."

For purposes of the present application, it is noted that an active transmitter is a transmitter that transmits a PPC symbol, which includes identification information using at least a portion of the subcarriers (e.g., an interlace). The active transmitter is allocated only one active symbol, however, it is possible to allocate any number of active symbols to a transmitter. Thus, each transmitter is associated with an "active symbol" with which the transmitter transmits information including identifying information. When a transmitter is not in the active state, it transmits on a defined idle portion (e.g., interlace) of the PPC symbol. Receiving devices in the network can then be configured to not "listen" for information in the idle portion of the PPC symbols. This allows transmitters to transmit during the idle portion of the PPC symbols to provide power (i.e., energy per symbol) stability to maintain network performance. In a further example, symbols transmitted on the PPC are designed to have a long cyclic prefix (CP) so that a receiving device may utilize information from far away transmitters for the purpose of position determination. This mechanism allows a receiving device to receive identification information from a particular transmitter during its associated active symbol without interference from other transmitters in the region because other transmitters are transmitting on the idle portion (interlace) of the symbol.

Figure 2:
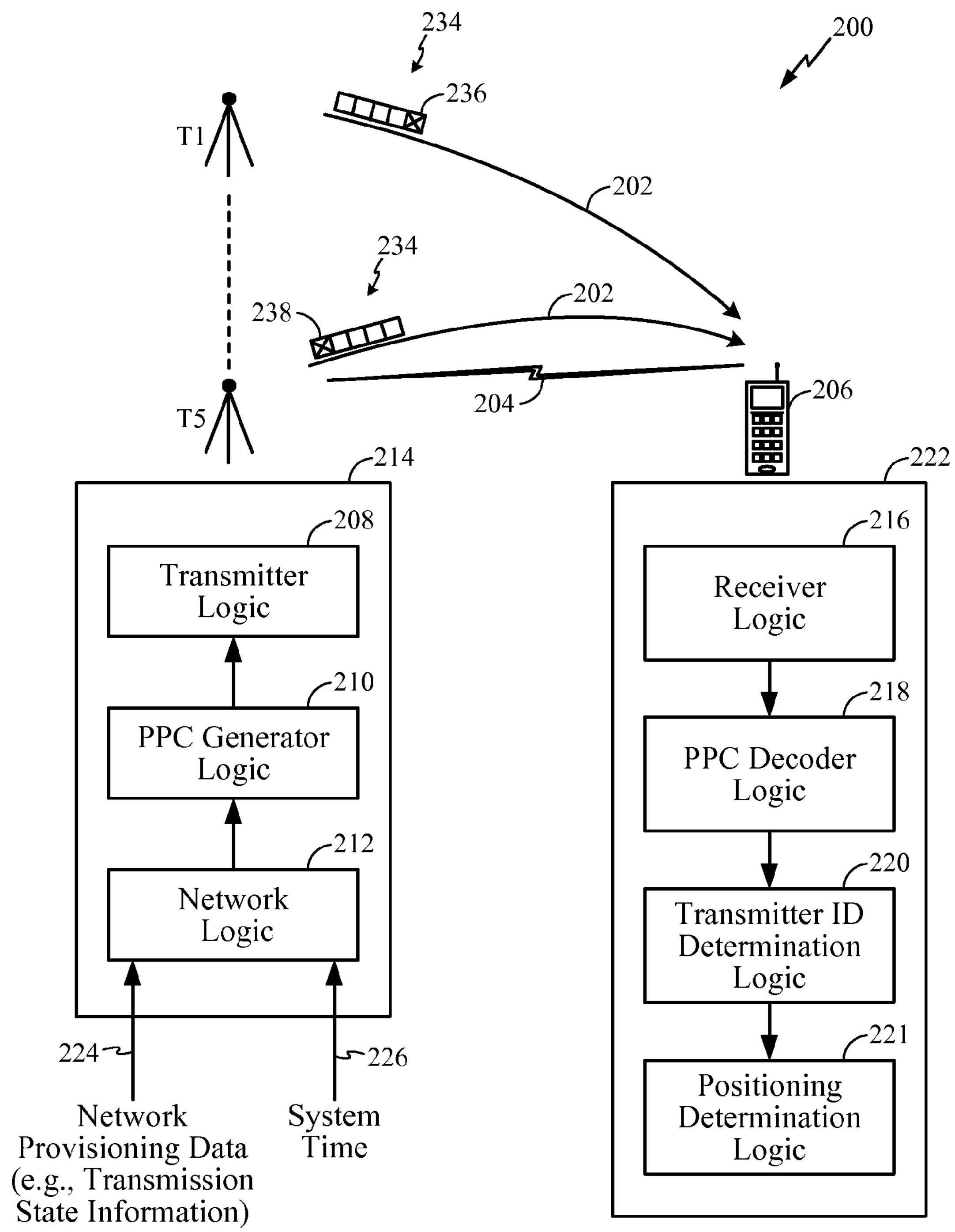
FIG. 2 illustrates an example of a communication system featuring transmission of transmitter identification information.

FIG. 2 shows an example of a communication system 200 that includes transmission of transmitter identification information (referred to herein as TxID). System 200 includes a plurality of transmitters (e.g., five transmitters T1 through T5) that transmit superframes including a pilot positioning channel (PPC) 202 over a wireless link 204 to at least one receiving device 206. The transmitters T1-T5 may represent those transmitters that are nearby to the device 206 and may include transmitters within the same local area as the device 206, transmitters in a different local area, or transmitters in a different wide area. It is noted that the transmitters T1-T5 may be part of a communication network synchronized to a single time base (e.g., GPS time) such that the superframes transmitted from the transmitters T1-T5 are aligned and synchronized in time. Note that it is possible to allow for a fixed offset of the start of superframe with respect to the single time base and account for the offset of the respective transmitters in the determination of the propagation delay. Thus, the content of the transmitted superframes may be identical for transmitters within the same local area, but may be different for transmitters in different local or wide areas, however, because the network is synchronized, the superframes are aligned and the receiving device 206 can receive symbols from nearby transmitters over the PPC 202 and those symbols are also aligned.

Each of the transmitters T1-T5 may comprise transmitter logic 208, PPC generator logic 210, and network logic 212, as illustrated by exemplary transmitter block 214. Receiving device 206 may include receiver logic 216, PPC decoder logic 218, and transmitter ID determination logic 220, as illustrated by exemplary receiving device 222.

It is noted that transmitter logic 208 may comprise hardware, software, firmware, or any suitable combination thereof. Transmitter logic 208 is operable to transmit audio, video, and network services using the transmission superframe. The transmitter logic 208 is also operable to transmit one or more PPC symbols in a superframe. In an example, the transmitter logic 208 transmits one or more PPC symbols 234, which are within a superframe, over the PPC 202 to provide transmitter identification information for use by the receiving device 222 to identify particular transmitters, as well as for other purposes such as positioning.

The PPC generator logic 210 comprises hardware, software or any combination thereof. The PPC generator logic 210 operates to incorporate transmitter identification information into the symbols 234 transmitted over the PPC 202. In an example, each PPC symbol comprises a plurality of subcarriers that are grouped into a selected number of interlaces. An interlace, in turn, may be defined as a set or collection of uniformly spaced subcarriers spanning the available frequency band. It is noted that interlaces may also consist of a group of subcarriers that are not uniformly spaced.

In an example, each of the transmitters T1-T5 is allocated at least one PPC symbol that is referred to as the active symbol for that transmitter. For example, the transmitter T1 is allocated PPC symbol 236 within the PPC symbols 234 in a superframe, and the transmitter T5 is allocated PPC symbol 238 within the PPC symbols 234 in a superframe.

The PPC generator logic 210 operates to encode transmitter identification information into the active symbol for that transmitter. For example, the interlaces of each symbol are grouped into two groups referred to as "active interlaces" and "idle interlaces." The PPC generator logic 210 operates to encode transmitter identification information on dedicated active interlaces of the active symbol for that transmitter. For instance, the transmitter T1 identification information is transmitted on the active interlaces of the symbol 236, and the transmitter T5 identification information is transmitted on dedicated active interlaces of the symbol 238. When a transmitter is not transmitting its identification on the active symbol, the PPC generator logic 210 operates to encode idle information on idle interlaces of the remaining symbols. For example, if the PPC 202 comprises ten symbols, then in an SFN network up to ten transmitters will each be assigned one PPC symbol as their respective active symbol. Each transmitter will encode identification information on the active interlaces of its respective active symbol, and will encode idle information on the idle interlaces of the remaining symbols. It is noted that when a transmitter is transmitting idle information on the idle interlaces of a PPC symbol, the transmitter logic 212 operates to adjust the power of the transmitted symbol so as to maintain a constant energy per symbol power level.

The network logic 212 may be configured by hardware, software, firmware, or any combination thereof. The network logic 212 is operable to receive network provisioning information 224 and system time 226 for use by the system. The provisioning information 224 is used to determine an active symbol for each of the transmitters T1-T5 during which each transmitter is to transmit identification information on their active symbol's active interlaces. The system time 226 is used to synchronize transmissions so that a receiving device is able to determine a channel estimate for a particular transmitter as well as aid in propagation delay measurements.

The receiver logic 218 comprises hardware, software, or any combination thereof. The receiver logic 218 operates to receive the transmission superframe and the PPC symbols 234 on the PPC 202 from nearby transmitters. The receiver logic 218 operates to receive the PPC symbols 234 and passed them to the PPC decoder logic 220.

The PPC decoder logic 220 comprises hardware, software, or any combination thereof. The PPC decoder logic 220 operates to decode the PPC symbols to determine the identity of a particular transmitter associated with each symbol. For example, the decode logic 220 operates to decode the received active interlaces of each PPC symbol to determine the identity of a particular transmitter associated with that symbol. Once a transmitter identity is determined, the PPC decoder logic 220 operates to determine a channel estimate for that transmitter. For example, using a time reference associated with the received superframe, the PPC decoder logic 220 can determine a channel estimate for the active transmitter associated with each received PPC symbol. Thus, the PPC decoder logic 220 operates to determine a number of transmitter identifiers and associated channel estimates. This information is then passed to the position determination logic 222.

The position determination logic 222 comprises hardware, software, or any combination thereof. The position determination logic 222 operates to calculate a position of the device 206 based on the decoded transmitter identification information and associated channel estimates received from the PPC decoder logic 220. For example, the locations of the transmitters T1-T5 are known to network entities. The channel estimates are used to determine the device's distance from those locations. The position determination logic 222 then uses triangulation techniques to triangulate the position of the device 206.

During operation, each of the transmitters 202 encodes transmitter identification information on at least one of the active interlaces of an active PPC symbol associated with that transmitter. The PPC generator logic 214 operates to determine which symbol is the active symbol for a particular transmitter based on the network provisioning information 224. When a transmitter is not transmitting its identification information on the active interlaces of its active symbol, the PPC generator logic 214 causes the transmitter to transmit idle information on the idle interlaces of the remaining PPC symbols. Because each transmitter is transmitting energy in each PPC symbol, (i.e., either on the active or idle interlaces) transmitter power does not experience fluctuations that would disrupt network performance.

When the device 206 receives the PPC symbols 234 over the PPC 202 from the transmitters T1-T5, it decodes the transmitter identifiers from the active interlaces of each PPC symbol. Once a transmitter is identified from each PPC symbol, the device is able to determine a channel estimate for that transmitter based on the available system timing. The device continues to determine channel estimates for the transmitters it identifies until channel estimates for a number of transmitters (i.e., preferable four estimates) are obtained. Based on these estimates, the position determination logic 222 operates to triangulate the device's position 228 using standard triangulation techniques. In another example, the position determination logic 222 operates to transmit the transmitter identifiers and associated channel estimates to another network entity that performs the triangulation or other positioning algorithm to determine the device's position.

In an example, the positioning system comprises a computer program having one or more program instructions ("instructions") stored on a computer-readable medium, which when executed by at least one processor, provides the functions of the positioning system described herein. For example, instructions may be loaded into the PPC generator logic 214 and/or the PPC decoder logic 220 from a computer-readable medium, such as a floppy disk, CDROM, memory card, FLASH memory device, RAM, ROM, or any other type of memory device. In another example, the instructions may be downloaded from an external device or network resource. The instructions, when executed by at least one processor operate to provide examples of a positioning system as described herein.

Thus, the positioning system operates at a transmitter to determine an active PPC symbol in which a particular transmitter is to transmit its identifying information on the active interlaces of that symbol. The positioning system also operates at a receiving device to determine channel estimates for transmitters identified in the received PPC symbols and perform triangulation techniques to determine a device position.

Figure 3:
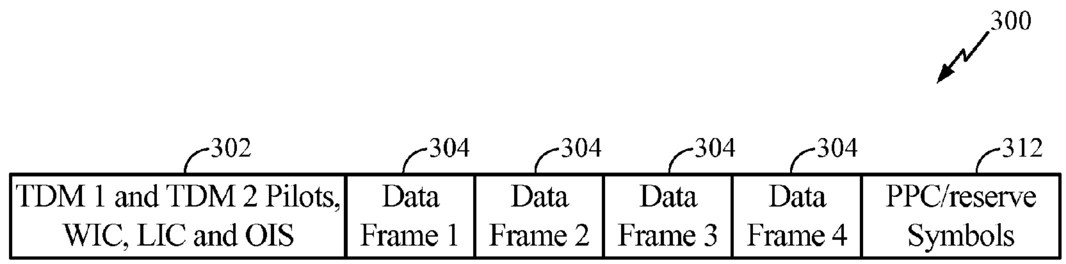
FIG. 3 shows a transmission superframe that may be used in the systems of FIG. 1 or 2.

FIG. 3 shows a transmission superframe 300 that may be used in the systems of either FIG. 1 or 2. As shown, each superframe 300 includes prefatory data 302 including time division multiplexed (TDM) pilots (e.g., TDM1 and TDM2), Wide Area Identification Channel (WIC), Local Area Identification Channel (LIC), and overhead information symbols (OIS) 302, one or more data frames 304 (e.g., 4 data frames in the example of FIG. 3), and PPC/reserve symbols 306.

According to an example, the PPC symbols may be configured such that a cyclic prefix length is increased to half of the number of subcarriers, such as to 2048 chips in the example of a 4096 subcarrier symbol. The increased cyclic prefix allows receiving devices receiving the superframes to more adequately account for the variability of channel delay spreads, for example. Thus, according to an example, each physical layer (PHY) PPC symbol would have a duration of 6161 chips (2048 chip cyclic prefix+4096 chips+17 chip window). It is noted here that this disclosed example assumes a "4K" (i.e., 4096 chip window) Fast Fourier Transform (FFT) mode. Additionally, according to this example, the Media Access Control (MAC) PPC symbol can be defined as equal to one PHY PPC symbol having a duration of 6161 chips (i.e., the PHY PPC for a "4K" FFT) having eight interlaces per symbol, as will be discussed later. The PPC symbol structure, however, may be configured such that it is similar to the data symbol structure for a corresponding FFT mode (e.g., 1K, 2K, or 8K). Thus, for 1K and 2K FFT modes, the number of chips per symbol would be, for example, 1553 chips (1024 chips+512 cyclic prefix+17 windowing chips) and 3089 chips, respectively, again assuming a cyclic prefix equal to one half the FFT window and 17 windowing chips. The number of MAC PPC symbols in a superframe (e.g., 8) would still be the same as the 4K mode. It is noted that this numerology is given merely as an example, and that one skilled in the art will appreciate other PPC symbol configurations and durations are possible within the scope of the present disclosure.

As may be garnered from the above discussion, the cyclic prefix for PPC symbols in all the FFT modes will be different from data symbols. For example, the cyclic prefix for a 4K FFT mode would be 2048 chips, as mentioned above, rather than the more typical 512 chips for a data symbol.

Figure 4:
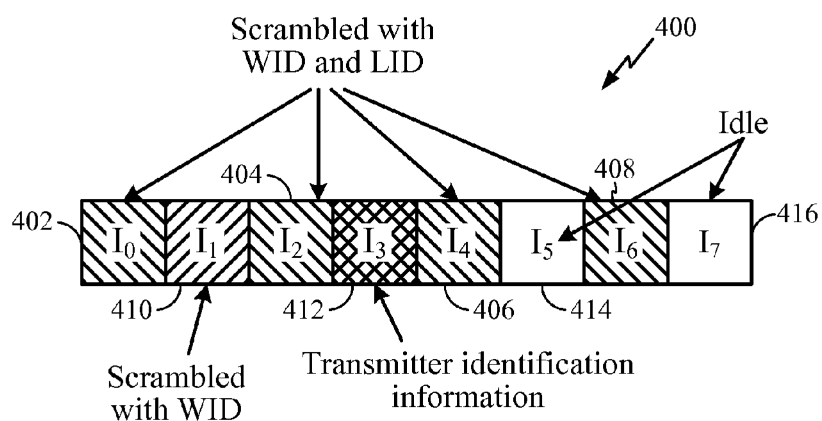
FIG. 4 shows a functional diagram of an interlace structure of an OFDM symbol used for PPC symbols transmitted by an active transmitter.

FIG. 4 shows a functional diagram of an interlace structure of an OFDM symbol 400 used for PPC symbols transmitted by an active transmitter. According to an example based on the exemplary numerology discussed above, the symbol 400 would include 4096 subcarriers that are divided and grouped into eight interlaces ($I_0$-$I_7$) as shown, such that each interlace comprises 512 subcarriers, which are typically not adjacent frequencies or tones. As was mentioned previously, a receiver needs may used First, a receiving device needs to determine a channel estimate using the pilot subcarriers in the symbol. Second, a receiving device needs to determine the identity of the transmitter to which the channel estimate corresponds.

The interlaces in active symbol 400 are used to transmit pilot tones, as well as transmitter identification information. In the particular example of FIG. 4, a first portion of the subcarriers of the symbol 400, namely interlaces $I_0$, $I_2$, $I_4$, $I_6$, labeled with reference numbers 402, 404, 406, and 408, respectively, as well as interlace $I_1$, labeled with 410, are active interlaces used for transmitting pilot tones. In the case of interlaces $I_0$, $I_2$, $I_4$, $I_6$, the pilots are scrambled with a wide area scrambler seed (i.e., wide-area differentiator bits (WID)) and a local area scrambler seed (i.e., local area differentiator bits (LID)) to ensure maximum interference suppression across the network(s). Furthermore, the interlace $I_1$ is used by the active transmitter to transmit pilots, which are scrambled with the WID only (e.g., the LID is set to zero) in order to reduce the number of hypotheses a receiver has to postulate, and hence processing, in order to jointly determine the WID and the LID.

According to a particular example, a wide area identifier WOI ID and a local area identifier LOI ID are available at the higher layers and are in fact available when the OIS symbols are decoded. At the physical layer, the transmissions across various regions and sub-regions (i.e., wide and local areas) are distinguished via the use of different scrambler seeds (WID and/or LID). In an example, the WID may be a 4-bit field and serves to separate the wide area transmissions and the LID another 4-bit field to separate the local area transmissions. Since, there are only 16 possible WID values and 16 possible LID values, the WID and LID values may not be unique across the entire network deployment. For example, a given combination of WID and LID could potentially map to multiple WOI ID and LOI ID. Nonetheless, network planning can be accomplished so that the re-use of WID and LID will be geographically separated. Hence, in a given neighborhood, it is possible to map a given WID and a LID to a particular WOI and LOI without any ambiguity. Therefore, at the physical layer, the PPC waveform is designed to carry the WID and the LID information (i.e., scrambling with interlaces $I_0$, $I_2$, $I_4$, $I_6$, and $I_1$)

As described above, a transmitter in the active state should transmit at least 2048 pilots in order to enable the receiver to estimate the channels with required delay spreads. This corresponds to four interlaces for the active transmitter. The four active interlaces (e.g., $I_0$, $I_2$, $I_4$, $I_6$) are then scrambled using the WID and the LID pertaining to the wide and local area to which the transmitter belongs. A receiver of the symbol would thus first extract the WID and the LID information from the pilots in the active interlaces of a PPC symbol and then uses the WID/LID information to obtain the channel estimate from that particular transmitter. Scrambling with WID and LID also provides interference suppression from transmitters in neighboring local area networks.

The corresponding WID/LID identification step at the receiver may become complicated however. For example, if each interlace is scrambled using both WID and LID, the receiver will have to jointly detect the WID and the LID seeds used for scrambling. There are 16 possibilities for each so that the receiver will have to try out 256 hypotheses for joint detection. Accordingly, receiver detection may be simplified by allowing separate detection of the WID and LID seeds. Therefore, in the disclosed example, the PPC waveform includes another group of subcarriers or interlace (e.g. interlace $I_1$ demarcated with reference number 410) having pilots scrambled with only WID values where the LID bit values are set to 0000.

In addition to the above, the present apparatus and methods include use of another portion of the subcarriers to transmit a specific transmitter identification information self-contained in the PPC symbol 400. In particular, this second portion of subcarriers comprises another non-zero interlace in a PPC symbol. According to the example illustrated in FIG. 4, interlace $I_3$ labeled with reference number 412 may include the transmitter identification information, although any other free interlace could have been used. This self-contained transmitter identification information allows a receiver to process a PPC independent of normal superframe processing. In particular, procurement of a transmitter identification can be derived solely from PPC processing, and would only rely on detection of the TDM1 pilot channel, which is used for coarse timing detection, for PPC processing. Moreover, this gives rise to a transmitter specific PPC channel that may be useful for supporting location specific applications in a communication network since each transmitter is, in essence, provided with an interference free channel. Thus, for example, each transmitter may be configured to impart information concerning specific applications apart from merely the transmitter identification information over the transmitter specific channel. Thus, interlaces within further PPC symbols may be utilized to convey the specific application data to receiving devices.

The specific type of information included in the transmitter identification information may first include transmitter identifier bits, which provide a unique identifier for the transmitter. In an example, the number of bits contemplated may be 18, although any suitable number of bits may be utilized. Also, additional signaling information bits may be allocated in the transmitter identification information to indicate with greater specificity concerning further information to be transmitted. For example, the signaling information can be used to indicate to a receiving device if the transmitter uses further symbols for transmitting other information and how many further symbols will be used. In an example, the signaling information is comprised of 3 bits. Thus, in this example, the payload of the transmitter identification information would be 21 bits (18 bits for transmitter ID+3 bits for signaling information), although fewer or greater numbers may be contemplated.

The transmitter identification information may also include an error detecting code, such as a cyclic redundancy check (CRC). In an example, the CRC function may be defined with CRC polynomial $g(x)=x^7+x^6+x^4+1$, which yields a 7 bit CRC.

Interlace $I_3$ (although any other free interlace could have been used), labeled 412, may include the transmitter identification information in the form of one or more transmitter location coordinates (e.g. GPS longitude, latitude and or altitude coordinates). Additionally, slot 3, as a possible transmitter identification indication repository, may also include network delay information. It should be noted that the interlaces, as used with transmitter location identification, are also referenced herein as slots. Consequently, in one aspect, slot 3, i.e., Interlace $I_3$, may hold the transmitter (TX) location information.

In one approach, Approach 1, regardless of whether transmitter identification information or other parameters are signaled within the PPC packet, a fixed bit PPC packet length of say 80 bits is used. This provides 10 blocks of 8 bits each with each 8 bits converted to 100 bits. A longer payload may be achieved as compared with a PPC packet of shorter length. A single PPC packet size is beneficial in both testing and implementation. The packet type (field allocation) is self-contained and allows for extensibility to include other parameters such as transmitter power and Super-frame number Two ways of implementing how the PPC bits are allocated are shown in options 1 and 2 shown on Slide 1. Reed-Muller encoding may be used with both implementations. Other variations include using the same base (64,7) Reed-Muller code, but truncating to (41,7). The transmitter ID is repeated two times in Option 2 instead of leaving 50 bits reserved. Other coding schemes are possible in generating 68 bits from the 18 bit transmitter ID.

In another approach, Approach 2, regardless of whether transmitter ID information is signaled within the PPC packet, a 56 bit PPC packet is employed. One bit allocation is illustrated on slide 2. Also further attributes and benefits of Approach 2 are shown in slides 3 and 4.

A third approach, Approach 3, is set forth on the accompanying slides 5-8 with a sample format allocation shown on slide 17. Since for each PPC MAC time unit each transmitter can be in one of three states, i.e., inactive, identification or reserved, with Approach 3, the reserved state of the PPC is used as the transmitter-specific channel. Information includes transmitter ID information as well as the latitude, longitude, and altitude of the transmitter in addition to the network delay. This approach allows for a larger payload employs turbo encoding. Turbo encoding offers a more robust encoding as compared with Reed-Muller encoding for a 1000 bit payload as shown on slide 6. As shown on slide 5, one embodiment includes 4 pilot slots with three data slots. The PPC transmitter ID information and PPC transmitter location information can be placed in any of the data slots. Another embodiment includes 5 data slots and 2 pilot slots. More redundancy exists with 5 data slots as compared with 3 data slots. As may further be seen in FIG. 4, two interlaces or groups of subcarriers (e.g., interlaces $I_5$ and $I_7$ in the example of FIG. 4, which are denoted by reference numbers 414 and 416) will be idle or zeroed out in the active PPC symbol 400. It then follows that the energy in each interlace is (8/6) times the total OFDM symbol energy in order to ensure essentially constant power levels for each OFDM PPC symbol. It is noted, however, that the power or energy allocation between the utilized interlaces in active symbol 400 (e.g., interlaces $I_0$-$I_4$ and $I_6$) need not be uniform. Rather, the energy may be apportioned disparately among the different interlaces For example, the energy for interlace $I_3$ may be set at 8E/3, while the energy of interlaces $I_0$, $I_2$, $I_4$, and $I_6$ along with energy of interlace $I_1$ may be set at 2E/3 or, in otherwords, the energy level of interlace $I_3$ is 4 times greater than the energy of each of the five interlaces $I_0$, $I_1$, $I_2$, $I_4$, or $I_6$.

Given the exemplary superframe structure discussed above, a superframe can support eight transmitters in a local area using the eight PPC symbols available per superframe. The number of transmitters in a local area, however, could be higher than eight in certain deployments. Further, only the transmitters in a particular local area are constrained to be orthogonal in time. Therefore, network planning may be used to schedule transmitters across different local areas such that self interference in the network is avoided, or at least mitigated.

Moreover, it may be desirable to support more than 8 transmitters per local area. For purposes of example, it is assumed that 24 transmitters are to be supported in a local area. To support this deployment, the network could be configured such that each transmitter would transmit an active PPC symbol once in every three (3) superframes. In this case, network planning and overhead parameters could be used to notify transmitters when their respective active state is to occur, and when they are to transmit identification information on an assigned active symbol. Thus, the periodicity of three superframes is programmable at the network level so that the system is scalable enough to support additional transmitters. The periodicity employed by the network can be kept constant throughout the network deployment so that both the network planning as well as the overhead information used to convey the information can be simplified. In an example, the information about the periodicity being employed in the network is broadcast as overhead information in the higher layers to allow for easier programmability of this parameter. Additionally, with 30 PPC symbols available for each local area, the constraints on network planning to alleviate interference at the boundary of two different local areas are also eased.

Figure 5:
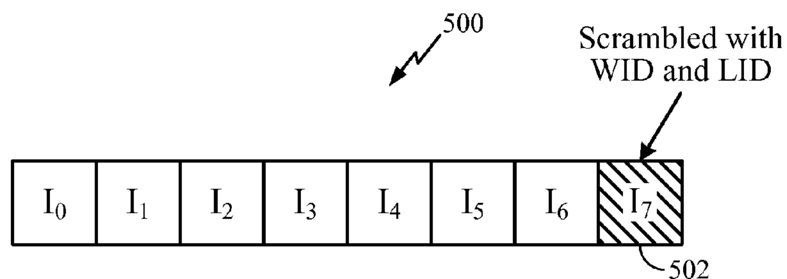
FIG. 5 shows a functional diagram of an interlace structure of an OFDM symbol used for PPC symbols transmitted by a passive or inactive transmitter.

FIG. 5 shows an exemplary PPC symbol transmitted by passive or inactive transmitters in a network, such as those illustrated in FIGS. 1 and 2. As may be seen, an inactive PPC symbol 500 has interlaces $I_0$ through $I_6$ are zeroed out. Interlace $I_7$, referred to with number 502, is the only interlace in the passive transmitter symbol 500 having non-zero energy. The pilots transmitted in interlace $I_7$ do not contain meaningful data or information, and the interlace can be referred to as a "dummy" interlace. According to the disclosed example, the energy in interlace $I_7$ is also scaled to 8 times the energy available per OFDM symbol interlace in order to meet the constant OFDM symbol energy constraint. Transmission of passive or inactive PPC symbol 500 ensures that the transmissions therein doe not interfere with the pilots of the active transmitter, which are transmitted on interlaces $I_0$, $I_1$, $I_2$, $I_4$, and $I_6$ as illustrated in FIG. 4.

Figure 6:
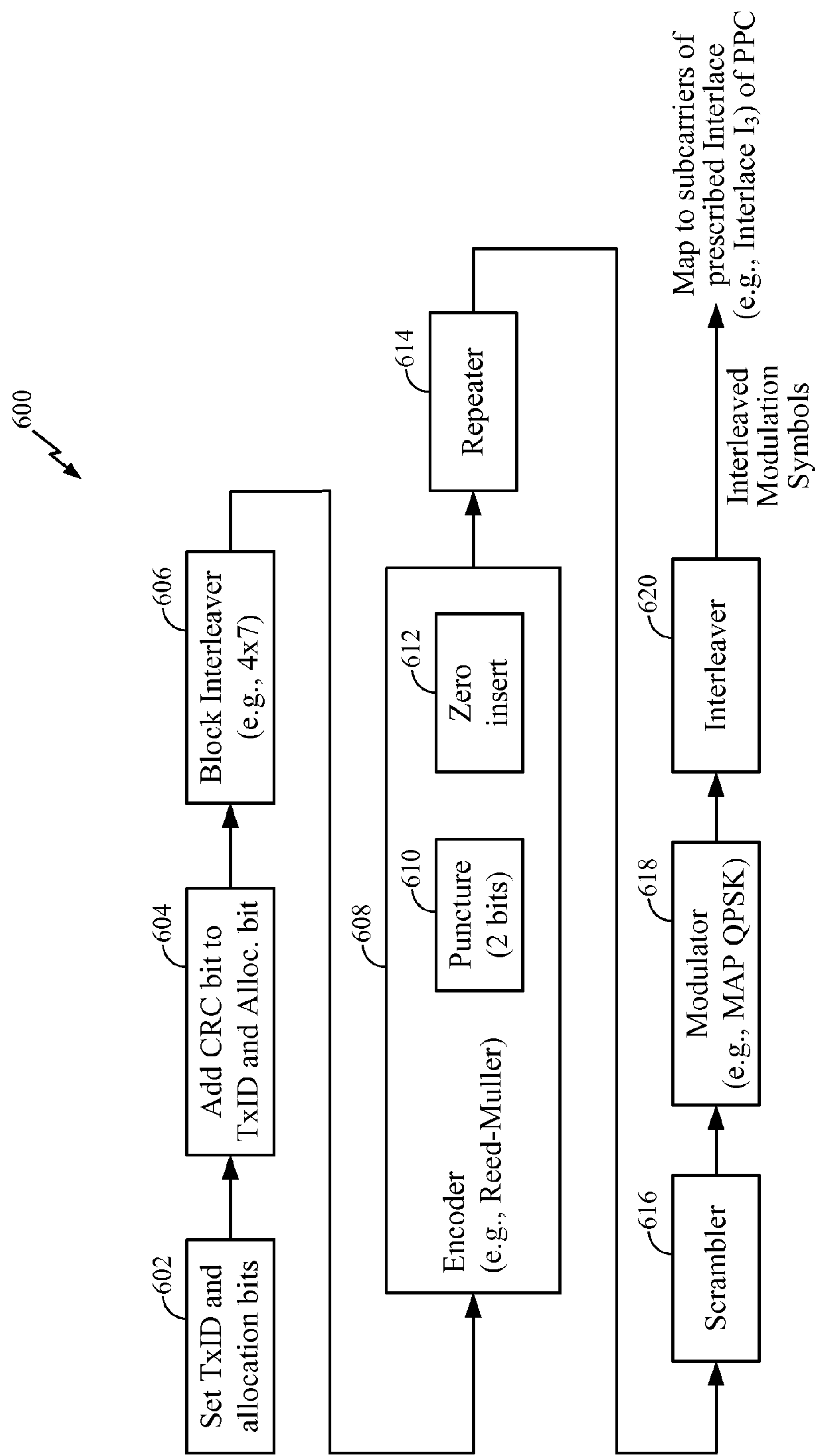
FIG. 6 illustrates an apparatus for encoding the transmitter identification in an interlace of an active PPC symbol, such as that illustrated in FIG. 4.

FIG. 6 illustrates an apparatus 600 for encoding the transmitter identification in an interlace of an active PPC symbol, such as that illustrated in FIG. 4. The apparatus 600 first includes a module 602 for setting or determining the transmitter identifier (TxID) bits and the allocation bits. As discussed above, the number of bits for TxID and the allocation may be set at 18 and 3, respectively. Assuming this implementation for purposes of illustration, 21 bits are passed from module 602 to a module 604 configured to add CRC bits (e.g., seven bits as discussed above) to the TxID and allocation bits. Module 604 then passes the total bits (which may be referred to collectively as the "transmitter identification information") to an interleaver 606 (e.g., a block interleaver). Assuming that 28 bits are passed, the block interleaver 606 may be configured as a 4×7 matrix where the bits are written in column-wise and correspondingly read out row-wise to achieve interleaving. It is noted, however, that various other types of suitable interleaving may be contemplated by those skilled in the art for use with the presently disclosed apparatus and methods.

The interleaved bits are read out to an encoder 608 to encode the bits according to a predetermined encoding scheme. In one example, encoder 608 may employ Reed-Muller (RM) error correcting code for encoding the bits, such as a first order (64, 7) RM code. In such an example, the interleaver 608 passes 28 information bits to the encoder 610.

With a (64,7) RM code, four code blocks of 64 bits would result from encoding the 28 information bits. In a particular example, however, where 250 coded bits is desirable to fit a particular numerology, the resultant 256 bits would be too great. Accordingly, 2 bits of the (64,7) RM code could be punctured, resulting in a (62,7) RM code as illustrated with puncture module 610 within encoder 608. In a particular example, the bits corresponding to the locations 62 and 63 in the Reed Muller codeword may be punctured. Thus, when the 28 information bits are encoded, the result would be 248 encoded bits. Two zeros can be appended to the four code blocks to achieve 250 coded bits, as further illustrated with zero insert module 612 within encoder 608. A receiver, in turn, will assume the bits were zero during decoding.

Figure 7:
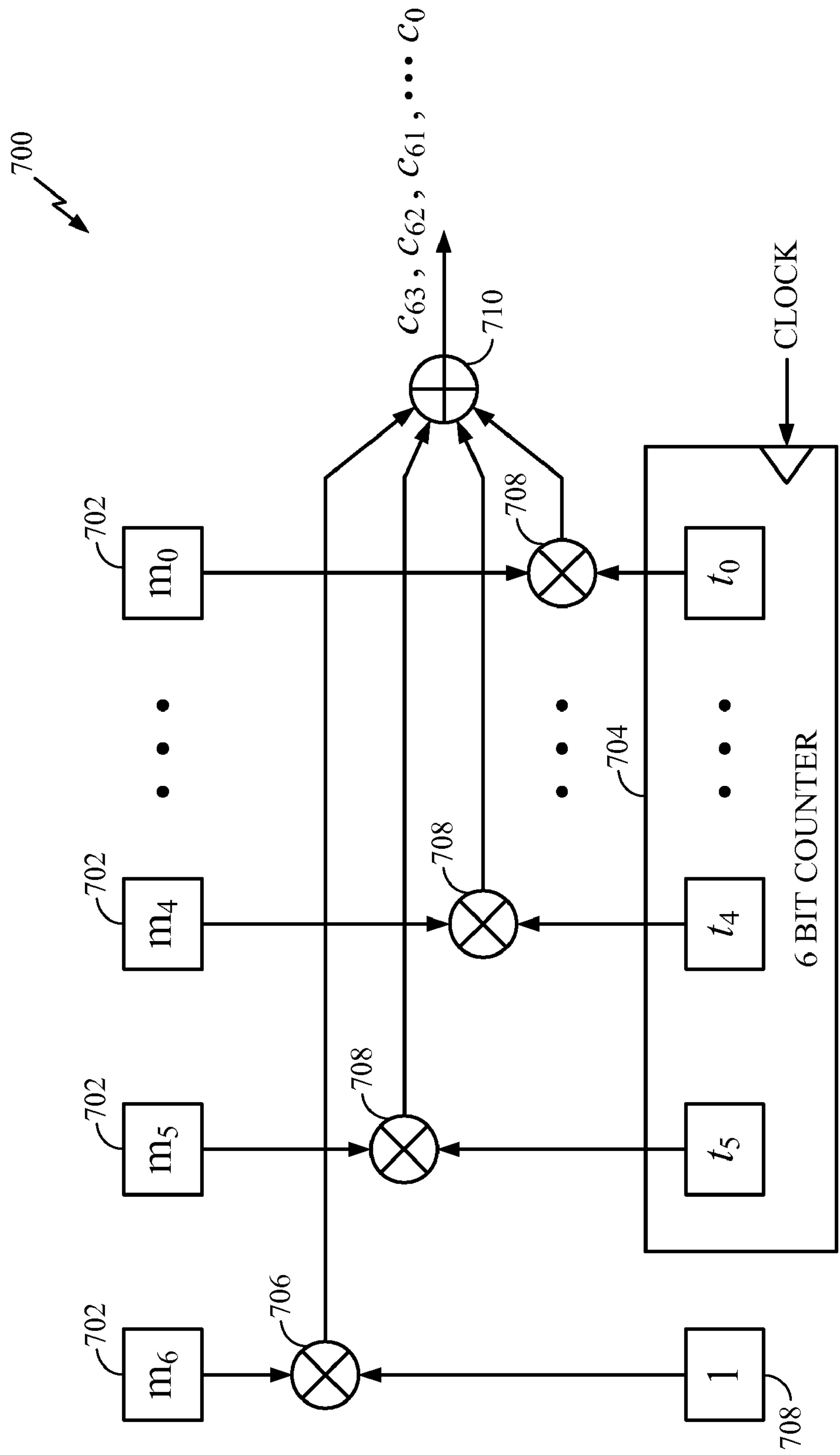
FIG. 7 illustrates an exemplary hardware circuit that may be utilized in a transmitter to generate a RM code.

FIG. 7 illustrates an exemplary hardware circuit 700 that may be utilized in a transmitter to generate the RM code, and more particularly within encoder 608. As illustrated, the hardware circuit 700 receives a 7 bit input, illustrated by inputs 702 receiving input bits $m_0$ through $m_6$. The circuit 700 also include a k-1 (e.g., 6) bit counter 704, which receives a clock input to cause the counter 704 to increment. The output of counter 704 is multiplied by each of input bits $m_0$ through $m_5$ by respective multipliers 706. Additionally, the most significant bit $m_6$ is multiplied by a constant binary "1" value (block 708). The outputs of the multipliers are summed by a summing block 710 and output a RM (64,7) codeword, which is a series of 64 bit values $c_{63}$ through $c_0$. It is noted that in an example, the punctured code may be obtained by dropping values $c_{62}$ and $c_{63}$.

Turning back to FIG. 6, once the transmitter information is encoded by encoder 608, a repeater 614 may be employed to ensure that the number of bits fits a particular numerology of the communication system. Such repetition affords an increase in the processing gain at a receiver. From the example above, the 250 bits output by encoder 608 could be repeated four times for a total of 1000 bits, which would result in a 6 dB processing gain at a receiver. After repeater 614 repeat the bits, the bits are scrambled, as illustrated by a scrambler 616. In an example, the bits may be scrambled with a seed based on the PPC symbol index (e.g., 0 through 7 in the present example) and the slot mask, which is the same as the interlace index. After scrambling, a modulator 618 modulates the scrambled bits for transmission according to any one of numerous modulation schemes. In the example above using 1000 bits, the bits may be mapped to QPSK symbols, which results in 500 QPSK symbols. In an OFDM physical layer symbol having 4096 data subcarriers divided into eight interlaces of 512 bits each, the 500 QPSK symbols will fill up one interlace, which may span one or multiple physical layer symbols dependent on the mapping of PHY layer symbols to PPC symbols having a 6475 chip duration. It is noted that the use of repeater 614, scrambler 616, and modulator 618 are only one example of a modulation scheme and that one skilled in the art will appreciate that other suitable modulation scheme may be utilized with the disclosed methods and apparatus.

Furthermore, in the above example it is assumed that a mode of the receiver has a 4096 samples (i.e., "4K") Fast Fourier Transform (FFT) window. It is noted that other FFT modes (e.g., 1K, 2K, or 8K) are contemplated using the same methods and apparatus.

After modulation by modulator 618, the modulation symbols may be interleaved by an interleaver 620 to mitigate frequency variations that may occur during transmission on the transmission channel, for example. Additionally, dependent on the FFT mode, the interlaced modulation symbols are mapped to one or more PPC physical layer (PHY) symbols. In the above example of a 4K FFT mode, 500 modulated symbols are interleaved and mapped to one PHY PPC symbol. In another example of an 2K FFT mode, the interleaved symbols could be interleaved or more may be interleaved among different interlaces (intra-interlace).

Figure 8:
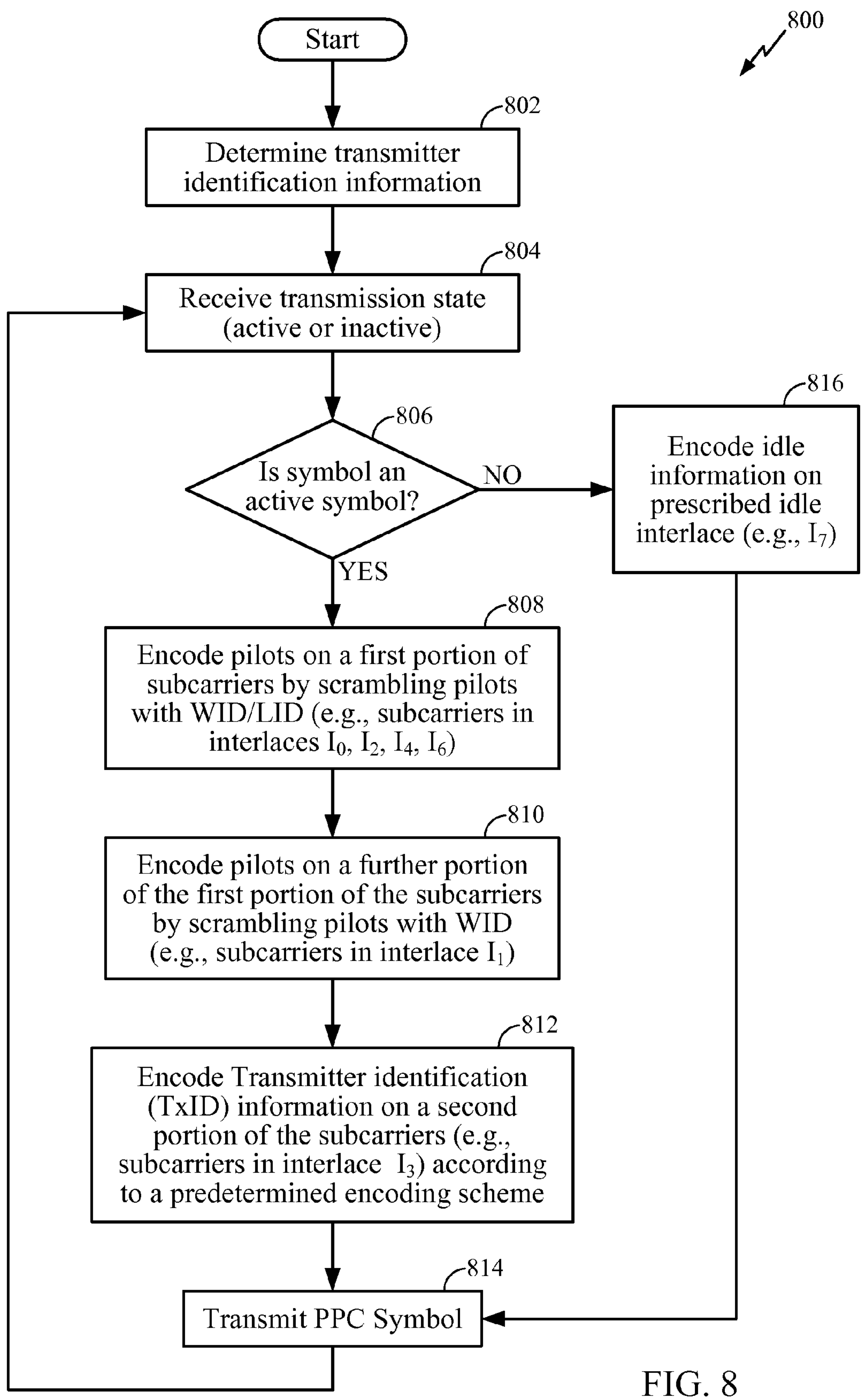
FIG. 8 shows a method for providing transmitter identification in a wireless system, such as the systems illustrated in FIGS. 1 and 2.

FIG. 8 shows a method 800 for providing transmitter identification in a wireless system, such as the systems illustrated in FIGS. 1 and 2. For example, the method 800 is suitable for use by a transmitter in a network to allow a receiving device to identify a transmitter, as well determine positioning based on the transmitter identification. In an example, method 800 may be effected by a transmitter configured as illustrated at 214 shown in FIG. 2.

As shown, after start of the method 800, flow proceeds to block 802 where transmitter identification information is determined. Such information may be garnered, as an example, from network provisioning data 224 sent to a transmitter 214, as illustrated by FIG. 2. Alternatively, the transmitter identification (TxID) information, may be inherent to the transmitter based on a prescribed network planning.

After the TxID information is determined or retrieved, a information concerning whether the transmitter is in an active or idle state for purposes of the PPC symbols is received by a transmitter as illustrated by block 804. As explained before, the active transmitter transmits on the active interlaces of a particular current PPC symbol, whereas currently idle transmitters transmit on the idle or dummy interlace of a current PPC symbol. In an example, the network logic (e.g., logic 212) in a transmitter (e.g., transmitter 214 in FIG. 2) receives the indication of the current transmitter state from the network provisioning data 224 from a suitable network administration entity or device.

In decision block 806, a determination is made whether the transmitter for the current PPC symbol is in the active or idle mode. This determination may be effected by PPC generator logic 210 in transmitter 214 shown in FIG. 2, as an example.

If the transmitter is active for the current PPC symbol, flow proceeds to block 808 where pilots are encoded on a first portion of subcarriers by scrambling pilots with WID and LID seeds (e.g., subcarriers in interlaces $I_0$, $I_2$, $I_4$, $I_6$). Additionally pilots are encoded on a further portion of the first portion of the subcarriers by scrambling pilots with the WID seed only (e.g., subcarriers in interlace $I_1$) as shown in block 810. It is noted that the designated "first portion" of subcarriers connotes that portion of the plurality of available subcarriers used to convey pilot tones such as those subcarriers in interlaces $I_0$, $I_2$, $I_4$, and $I_6$, as well as those subcarriers in interlace $I_1$. The encoding of the pilots as shown by blocks 808 and 810 may be effected, as an example, by transmitter logic 208 and PPC generator logic 210 illustrated in FIG. 2.

A second portion of subcarriers (e.g., subcarriers in interlace $I_3$) are encoded with transmitter identification (TxID) information as illustrated by block 812. The encoding of the TxID information is accomplished according to a predetermined encoding scheme, as was discussed previously in connection with the examples of FIGS. 4, 6, and 7. The encoding of the TxID as shown by block 812 may be effected, as an example, by transmitter logic 208 and PPC generator logic 210 illustrated in FIG. 2.

After the TxID is encoded, the PPC symbol is transmitted as illustrated by block 814. Flow then may proceed back to block 804 for encoding of a next PPC symbol, either in the same superframe or a subsequent superframe. Transmission of the symbol may be effected by a transmitter logic, such as logic 208, as an example.

If the current PPC symbol is not an active symbol as determined at decision block 806, flow alternatively proceeds to block 816 as illustrated in FIG. 8. In this case, a prescribed group of available subcarriers of the plurality of available subcarriers in the current PPC symbol (e.g., Interlace $I_7$) is encoded with idle information as shown by block 816. This encoding may be effected by PPC generator logic 210 and transmitter logic 208, as an example. After encoding in block 816, flow proceeds to block 814 for transmission of the PPC symbol.

It is further noted that the power level of the PPC symbol may also be performed as part of transmission of the PPC symbol at block 814. This ensures a constant symbol power for a SFN system, as was discussed previously. Power adjustment may be effected by the transmitter logic 208, as an example.

The method 800 thus operates to provide a system to provide transmitter identification via PPC symbols from a transmitter. It is noted that the method 800 represents just one implementation and the changes, additions, deletions, combinations or other modifications of the method 800 are possible within the scope of the present disclosure. Although for purposes of simplicity of explanation, the method of FIG. 8 is shown and described as a series or number of acts, it is to be understood that the processes described herein are not limited by the order of acts, as some acts may occur in different orders and/or concurrently with other acts from that shown and described herein. For example, those skilled in the art will appreciate that a methodology could alternatively be represented as a series of interrelated states or events, such as in a state diagram. Moreover, not all illustrated acts may be required to implement a method in accordance with the present exemplary method disclosed.

Figure 9:
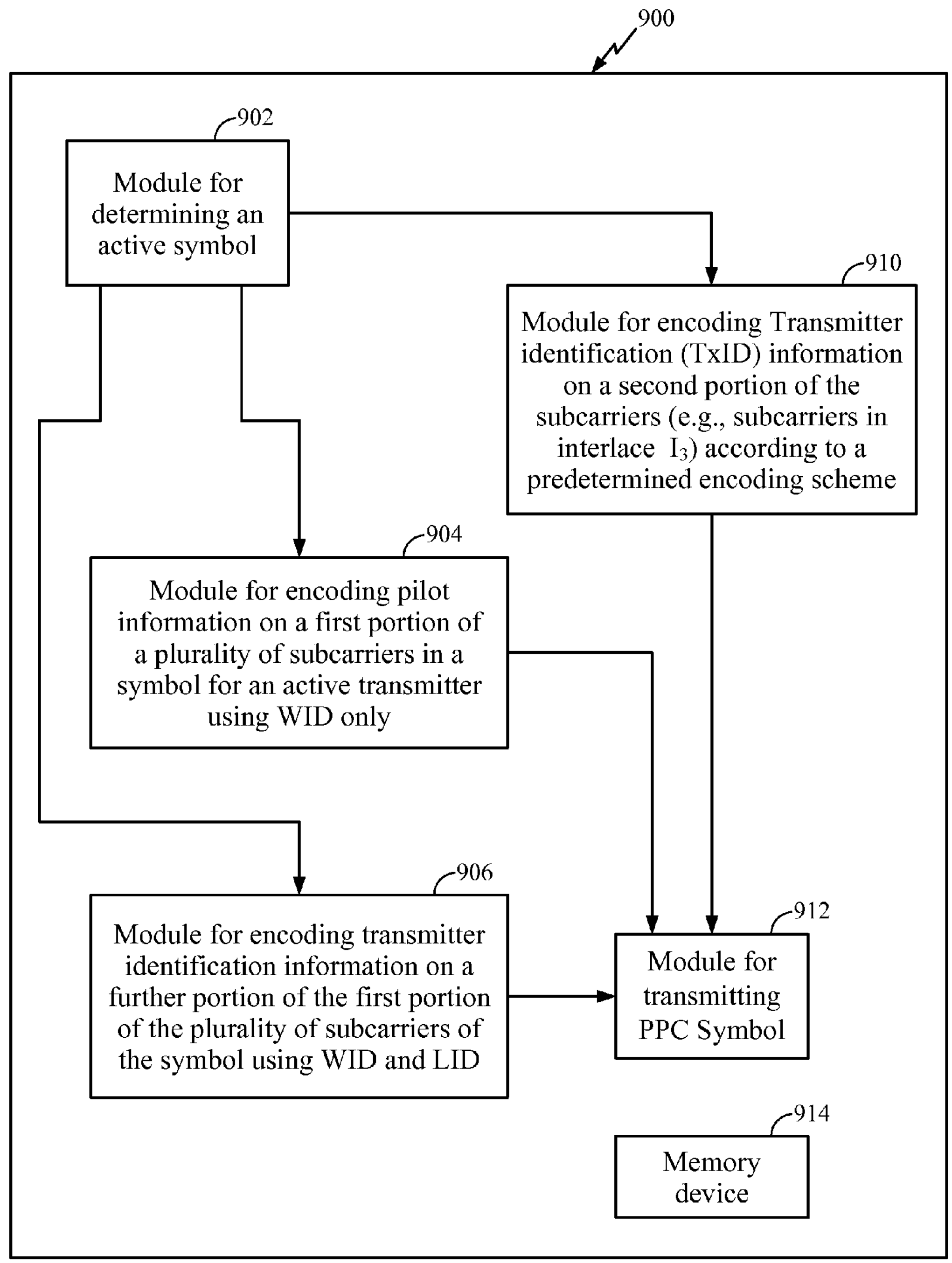
FIG. 9 illustrates an apparatus for transmitting a PPC symbol having transmitter identification information.

FIG. 9 illustrates an apparatus for transmitting a PPC symbol having transmitter identification information. The apparatus 900 may be implemented as a transmitter, such as transmitter 214 in FIG. 2, or as a component of a transmitter. The apparatus 900 includes a module 902 configured to receive network provisioning data (e.g., Transmission State Information). The module 902 may receive data such as provisioning data 224 disclosed in FIG. 2, or any other suitable data communicating information concerning the state of the transmitter, such as if the transmitter is active or idle for PPC transmission, or the transmitter identification information (TxID). As an example of an implementation of module 902, one or more of transmitter logic 208, PPC generator logic 210, and network logic 212 may be utilized.

Apparatus 900 further includes a module 904 for encoding pilot information on a first portion of a plurality of subcarriers in a symbol for an active transmitter using the seed WID. As an example of an implemented function of this module, the first portion of the plurality of subcarriers may be those subcarriers partitioned into interlace $I_1$, and scrambled with the WID seed (e.g., the LID set to 0000). Another module 906 is illustrated in FIG. 9 for encoding transmitter identification information on a further portion of the first portion of the plurality of subcarriers of the symbol using the WID and LID seeds. In a particular implementation, module 906 could be configured to encode pilot information using those subcarriers in interlaces $I_0$, $I_2$, $I_4$, and $I_6$.

Although modules 904 and 906 are shown bifurcated in the example of FIG. 9, these modules could be configured as a single module for encoding the pilot information on subcarriers that belong to the first portion of the plurality of subcarriers; namely interlaces $I_0$, $I_1$, $I_2$, $I_4$, and $I_6$. It is noted as an example of an implementation of modules 904 and 906, one or more of transmitter logic 208, PPC generator logic 210, and network logic 212 may be utilized.

Apparatus 900 further includes a module 908 used for encoding transmitter identification (TxID) information on a second portion of the plurality of subcarriers (e.g., subcarriers in interlace $I_3$) according to a predetermined encoding scheme. The It is noted as an example of an implementation of modules 904 and 906, one or more of transmitter logic 208, PPC generator logic 210, and network logic 212 may be utilized.

Apparatus 900 also includes a module 910 that is configured to transmit a PPC symbol, which includes the encoded pilots on the first portion of the plurality of subcarriers and the TxID on the second portion. Implementation of module 910 may be with the transmitter logic 208 or PPC generator logic 210, or a combination thereof.

It is noted that modules 902, 904, 906, 908, 910, and 912 may be implemented by at least one processor configured to execute program instructions or code to provide aspects of a system including transmitter identification and positioning as described herein. Additionally, a memory device 914 or equivalent computer-readable medium may be provided in connection with the at least one processor for storing the program instructions or code.

Figure 10:
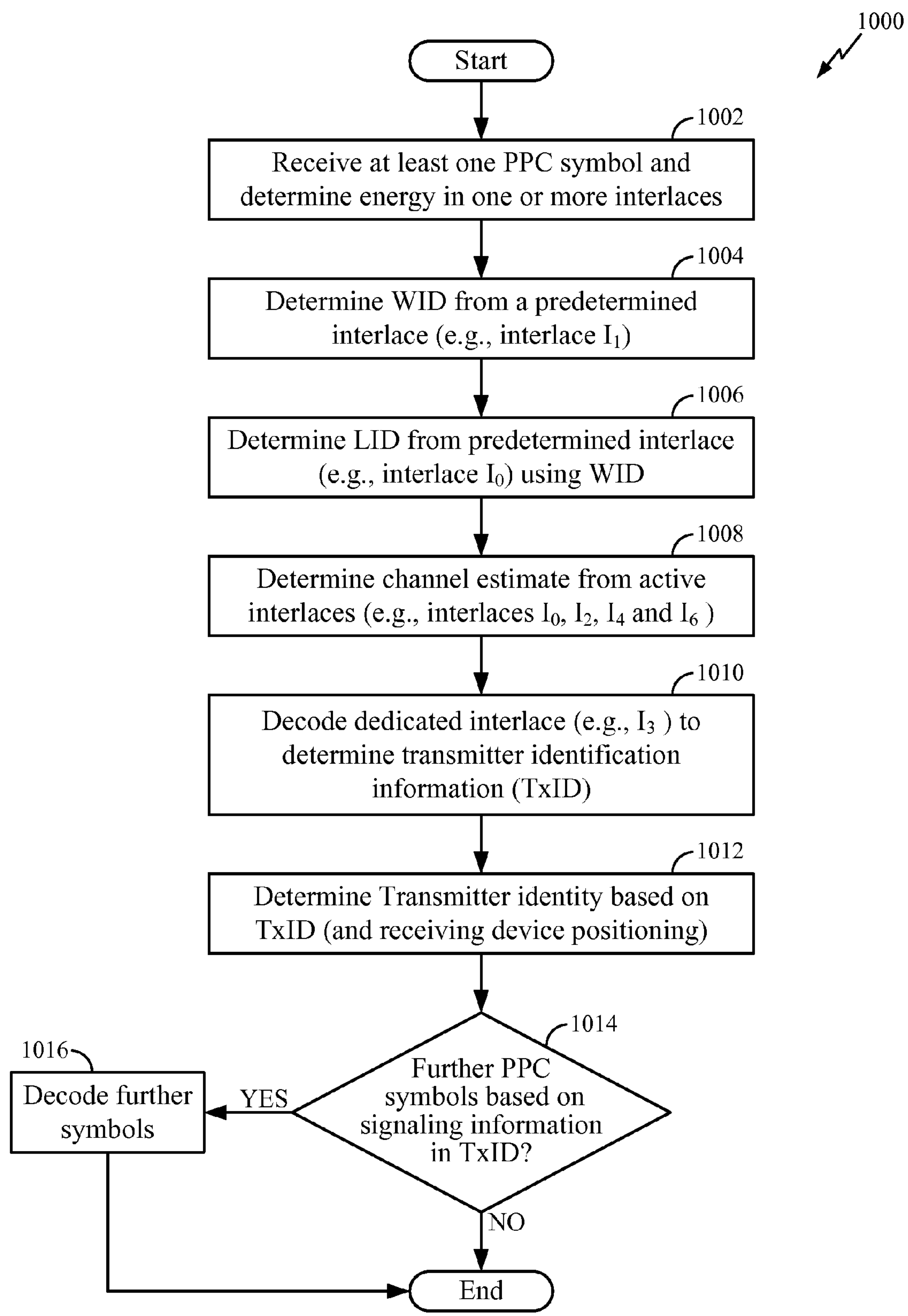
FIG. 10 shows a method for receiving a symbol including transmitter identification information.

FIG. 10 shows a method 1000 for receiving a symbol including transmitter identification information. For example, method 1000 is suitable for use by a receiving device in a network to receive and decode a PPC symbol transmitted by a currently active transmitter, such as for transmitter identification and position determination. In an example, method 1000 may be effected by a receiver configured as illustrated at 222 as shown in FIG. 2. Additionally, method 1000 is used As shown, once the method is started for a received symbol flow proceeds to block 1002. At block 1002, at least one PPC symbol is received by a receiver. In a particular example of a receiver in 4K mode, reception of the at least one PPC symbol involves collecting 4096 samples of the input signal. As shown, block 1002 also may include measuring the energy in one or more interlaces, such as for setting scale factors of the FFT, as well as for determining threshold energy values for determining the WID and LID values, which will be discussed below. In a particular example, the energy in interlace $I_1$ may be measured from time domain interlace samples of a first received PPC PHY symbol. Additionally, the energy of an unused interlace (e.g., interlace $I_5$) may also be measured to determine a measure of total interference (e.g., thermal and/or signal induced) on the PPC channel. It is noted that in another example, hardware in the receiver, such as receiver 222, may configured to interrupt a processor, such as a Digital Signal Processor (DSP), in order to program the FFT scale factors and thresholds that will be used by the hardware. The setting of FFT scale factors serves to improve the quantization noise floor for signals from weak transmitters, as an example.

Flow then proceeds to block 1004 the WID is determined from a group of subcarriers containing pilots scrambled with the WID only; namely interlace $I_1$ as discussed previously. In an example, this determination may be effected by receiver logic 216 and PPC decoder logic as illustrated in FIG. 2. In a further example of a 4K mode, it is noted that a 512 pt FFT may be utilized, which yields frequency domain samples. In an exemplary system, the WID detection would include a repeated sequence of descrambling (repeated 16 times in one exemplary system using 16 WID seeds), inverse FFT to yield time domain samples, and comparing the samples to an energy threshold (based on an energy measurement of the interlace) and accumulating energy values of samples above the threshold to determine which hypothesized WID value yields the maximum energy. The WID the maximum energy will correspond to the WID value.

After determination of the WID value, the LID value is next determined as illustrated by block 1006. Specifically, the LID is determined from a group of subcarriers containing pilots scrambled with the WID and LID; namely interlace $I_0$. In an example, this determination may be effected by receiver logic 216 and PPC decoder logic as illustrated in FIG. 2. In a further example of a 4K mode, it is noted that a 512 pt FFT may be utilized to yield frequency domain samples. In an exemplary system, the LID detection would include a repeated sequence of descrambling (repeated 16 times in one exemplary system using 16 WID and 16 LID seeds) using the WID detected from block 1002, perform an inverse FFT to yield time domain samples, and comparing those samples to an energy threshold (based on an energy measurement of an interlace, such as interlace $I_1$) to determine which hypothesized LID value yields the maximum energy. The LID the maximum energy will correspond to the LID value.

In block 1008 a plurality of the subcarriers encoded with pilots is then used to determine a channel estimate. In particular, interlaces $I_0$, $I_2$, $I_4$, and $I_6$ may be used to obtain the channel estimate. In an example of a receiver in 4K mode, a 512 sample FFT may be performed on each of the four interlaces to obtain frequency domain samples. The samples are then descrambled with the previously obtained WID and LID seeds. The descrambled pilots in frequency domain may then be input to a 2048 (2K) sample IFFT to obtain a time domain channel estimate. Once the time domain channel estimate is determined, the energy for each tap that will be read by a processor, such as a DSP, is computed and stored. Additionally, the computed energy may be compared with a threshold based on the previously measured energy of an unused interlace (e.g., interlace $I_5$) to determine the signal power of the transmitter currently active. It is noted that the procedure of block 1008 may be carried out by receiver logic 216 and PPC decoder logic as illustrated in FIG. 2, as examples.

In yet a further example of a procedure for determining the channel estimate assuming the above example, it is noted that the 2K time domain channel estimate may be aliased back to the original 512 time domain points or samples. An example of an aliasing pattern is given by the following relationship $$\tilde{h}_n = \sum_{q=0}^{3} h_{n+512q} e^{-\frac{j2\pi qs}{4}},\ n = 0, 1, \ldots 511 \tag{1}$$

where $\tilde{h}_n$ is the time domain channel estimate, s is the data interlace, and q is the channel bin index where each channel bin contains 512 channel taps in this particular example. Accordingly, if the data interlace of interest (s) is equal to 3, as an example, equation (1) above becomes:

$$\tilde{h}_n = h_n + jh_{n+512} - h_{n+1024} - jh_{n+1536} \tag{2}$$

After the channel estimate $\tilde{h}_n$ is determined as given in equation (2), a phase ramp can be applied to the time domain estimate as given by the following:

$$\tilde{h}_{n,pr} = h_n e^{\frac{-j2\pi ns}{2048}},\ n = 0, 1, \ldots 511 \tag{3}$$

For purposes of decoding the interlace a dedicated data interlace containing the transmitter identification information, the example above assumed that interlace s=3, or, in other words, the interlace $I_3$ given in the example of FIG. 4, which contains the TxID. A 512 sample FFT may then be performed on $\tilde{h}_{n,pr}$ to obtain a channel estimate with frequency domain samples.

After block 1008, flow proceeds to block 1010 where a dedicated data interlace with the transmitter identification information (TxID) is decoded. As illustrated in FIG. 4, this dedicated interlace may be interlace $I_3$. As a particular example of a process for decoding in a receiver in a 4K FFT mode, a 512 sample FFT may be performed on the aliased dedicated data interlace ($I_3$) to produce frequency domain samples, as mentioned above. The process of block 1008 may further include using the corresponding channel estimates to generate 1000 bit log likelihood ratios (LLRs) for interlace $I_3$ having QPSK modulation. The LLRs may then be de-interleaved similar to the de-interleaving of data symbols. Subsequently, the 1000 bit LLRs can be averaged over four periods to arrive at 250 bit LLRs. This averaging, for example, may be accomplished according to the following relationship:

$$\tilde{l}_k = l_k + l_{k+250} + l_{k+500} + l_{k+750},\ k = 0, 1, \ldots 249 \tag{4}$$

where $\tilde{l}_k$ represents an average LLR for a $k^{th}$ value. After the LLRs are averaged to yield 250 bit LLRs, they may be processed by a processor, such as a DSP. It is noted that in an example the averaging may be performed by hardware embodied by receiver logic 216 and/or PPC decoder logic 218, for instance. Additionally, the processor may be encompassed by the illustrated receiver logic 216 and/or PPC decoder logic 218 shown in FIG. 2, which are not necessarily meant to merely encompass hardware logic devices.

After the 250 bit LLRs are delivered to the processor, Reed Muller decoding may be performed. For example, a 64 dimensional Fast Hadamard Transform (FHT) of the LLRs may be computed for each codeblock, assuming the exemplary encoding discussed before using RM (64,7) coding. Further, since only 62 bits out of the 64 bits comprising the (64,7) RM code are transmitted by virtue of puncturing in the exemplary encoding discussed, the receiver may substitute the punctured bits with zeros for decoding purposes. Accordingly, the transform F is equal to H×L where H is a 64×64 Hadamard matrix and L represents the LLRs corresponding to one RM code block (i.e., 7 bits assuming the exemplary coding above using four code blocks for 28 bits). After the transform F has been computed, the location of the entry of the maximum magnitude within the transform F is determined. Due to the characteristics of the FHT, the binary representation of the location of the maximum magnitude entry will provide six of the seven message bits in the RM code block. The sign of the maximum magnitude entry provides the seventh message bit where the message bit is 0 if the sign is positive, and 1 if negative.

After all the RM code blocks containing the transmitter identification information are decoded (i.e., four RM code blocks in the present example), the cyclic redundancy check (CRC) may be checked to ensure that the received message bits are, with a high probability, error free. In the case where the CRC matches, the transmitter identification information is then useable by the receiver, as well as the WID, LID, and power measurement values.

The transmitter data within the transmitter identification information may then be used by a receiving device to identify the transmitter issuing the active PPC symbol as indicated by block 1012. Since the PPC symbol includes self-contained transmitter identification information, the receiving device does need to perform additional processing to identify the transmitter, thus affording quick and efficient transmitter identification. Additionally, it is noted that the information may be used to, along with one or more of the channel estimate, WID, LID, and power measurement information to determine positioning information concerning the receiving device with respect to the transmitter(s), such as through triangulation or any other suitable technique.

After the process of block 1012, flow proceeds to decision block 1014. A determination is made whether additional or further PPC symbols are indicated from the signaling information within the transmitter identification information. If no additional symbols are indicated, the process 1000 ends. Alternatively, if additional symbols are indicated flow proceeds from block 1014 to block 1016 for further decoding of the additional symbols. It is noted that the processing may be accomplished in a manner similar to the processes discussed above in connection with one or more of blocks 1002 through 1008.

It is noted that processes for decoding symbols for other FFT modes at a receiver device are also contemplated. For example, assuming a 2K FFT mode, a receiving device collects 2K samples from each symbol. A 256 point FFT may then be performed for each time domain interlace sample in the symbol. The frequency domain interlace samples from the 256 point FFT may then be concatenated with samples from across two symbols (e.g., PHY symbols). As an example, if the set of 256 interlace samples from a first symbol are represented as $Y_0=\{y_{0,0}, y_{1,0}, y_{2,0}, \ldots, y_{255,0}\}$ and the set of 256 interlace samples from a second symbol are represented as $Y_1=\{y_{0,1}, y_{1,1}, y_{2,1}, \ldots, y_{255,1}\}$, a resultant concatenation of these two sets of samples could be represented as $Y=\{y_{0,0}, y_{1,0}, y_{2,0}, \ldots, y_{255,0}, y_{0,1}, y_{1,1}, y_{2,1}, \ldots, y_{255,1}\}$. After concatenation of the 512 samples from multiple PHY symbols, WID and LID detection, channel estimation and LLR generation may be similar to the processing of a 4K FFT mode of operation, as discussed above in connection with one or more of blocks 1002 through 1016.

In another example of a 1K FFT mode, a 128 point FFT on time domain interlace samples from each PHY PPC symbol. Similar to the example above, the resultant frequency domain samples from 4 PHY PPC symbols are concatenated to form one interlace. In yet another example of an 8K FFT mode, it is noted that one interlace is comprised of 1000 subcarriers. Accordingly, processing by a receiving device would utilize 1K FFT/IFFT processing, as well as 4K IFFT processing for channel estimation.

The method 1000 thus operates to provide for receiving and processing a symbol including transmitter identification information at a receiving device. It is noted that the method 1000 represents just one implementation and the changes, additions, deletions, combinations or other modifications of the method 1000 are possible within the scope of the present disclosure. Although for purposes of simplicity of explanation, the method of FIG. 10 is shown and described as a series or number of acts, it is to be understood that the processes described herein are not limited by the order of acts, as some acts may occur in different orders and/or concurrently with other acts from that shown and described herein. For example, those skilled in the art will appreciate that a methodology could alternatively be represented as a series of interrelated states or events, such as in a state diagram. Moreover, not all illustrated acts may be required to implement a method in accordance with the present exemplary method disclosed.

Figure 11:
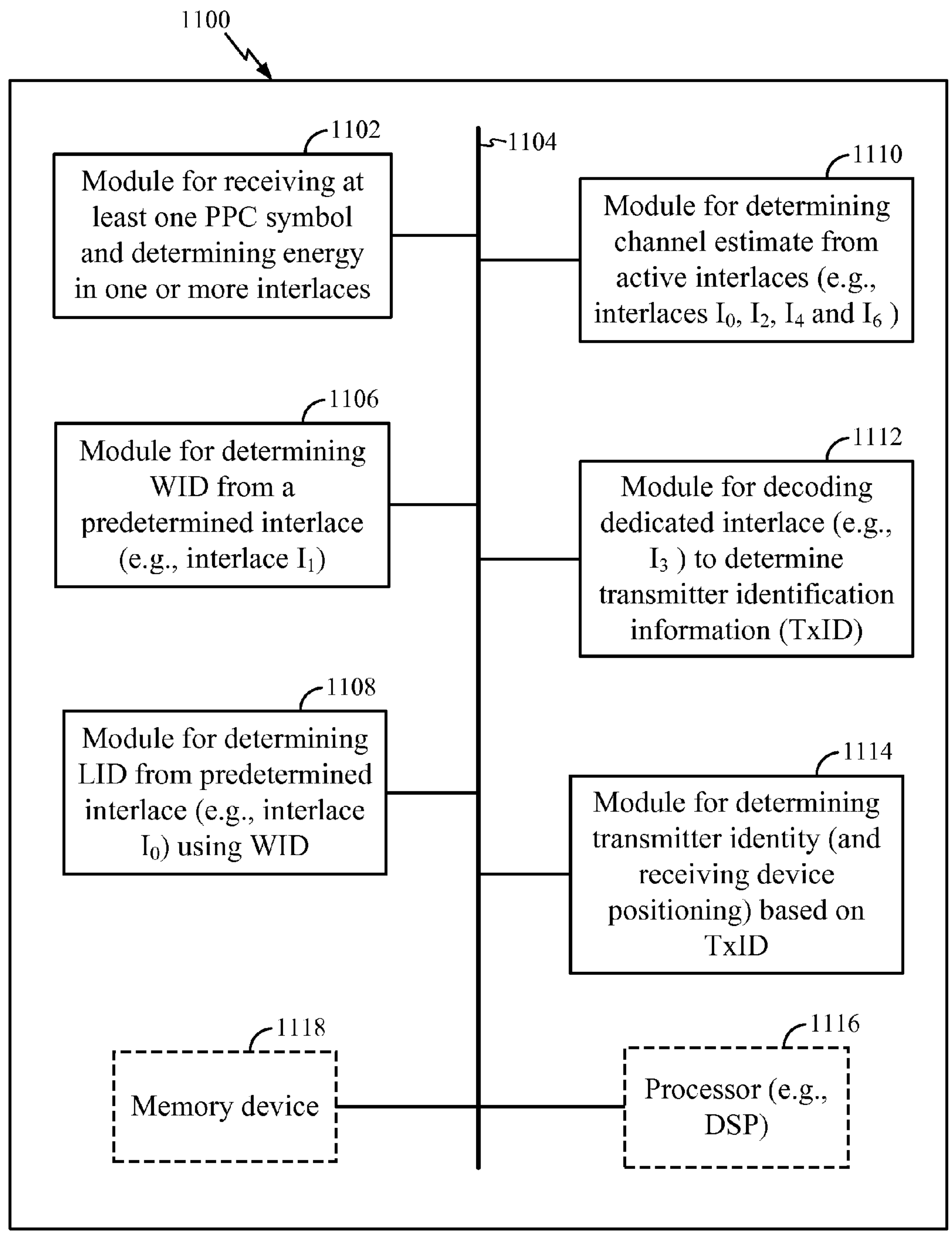
FIG. 11 shows another example of a receiver apparatus or, alternatively, an apparatus for use in a receiver usable in a system having transmitter identification information.

FIG. 11 shows another example of a receiver apparatus or, alternatively, an apparatus for use in a receiver 1100 usable in a system having transmitter identification information. The apparatus 1100 includes a module 1102 for receiving at least one PPC symbol and determining energy in one or more interlaces, such as a used interlace (e.g., $I_1$) and an unused interlace (e.g., $I_5$). The energy determination may then be shared with other modules within apparatus 1100, as illustrated by connection to a communication bus 1104. It is noted that this bus architecture is merely exemplary and intended to illustrate various communications are capable between modules within apparatus 1100.

Apparatus 1100 also includes a module 1106 for determining the WID seed from a predetermined interlace (e.g., interlace $I_1$). As was explained earlier, determination of the WID may include thresholding based on energy measured previously, such as be module 1102. The WID determined by module 1106 is passed to a module 1108 for determining LID from predetermined interlace (e.g., interlace $I_0$) using the WID. Also, the detection of the LID by module 1108 may employ the measured energy, which is determined by module 1102.

Apparatus 1100 further includes a module 1110 for determining a channel estimate from active interlaces (e.g., interlaces $I_0$, $I_2$, $I_4$ and $I_6$). As was explained previously, the determination of the channel estimate may include comparing energy computations of taps with an energy threshold, such as that determined by module 1102, for example. A module 1112 is also included for decoding dedicated interlace (e.g., $I_3$) to determine transmitter identification information (TxID) is further included. As an example, module 1112 may effect a process of decoding as detailed above in the description of block 1010 in connection with FIG. 10. Further, module 1114 is provided in apparatus 1100 for determining transmitter identity (and receiving device positioning based on transmitter ID, channel estimation and energy measurements) based on the TxID. Module 1114 may include the functionality of performing a cyclic redundancy check to ensure that the received message bits are error free, and if so, triggering population a transmitter ID table in the receiving apparatus 1100 with the transmitter identification, WID, LID, and power measured for use by a processor, such as processor 1116, which may be a DSP or other suitable processor(s). The transmitter ID table may be contained within a memory device 1118 in communication with the processor 1116 and/or the modules in apparatus 1100.

It is noted that modules 1102, 1106, 1108, 1110, 1112, and 1114 may be implemented by at least one processor configured to execute program instructions to provide examples of a system including transmitter identification and positioning as described herein. In an example, modules 1102, 1106, 1108, 1110, and 1112 may be implemented by the receiver logic 216 and/or PPC decoder logic 218. In an example, module 1114 is implemented by the position determination logic 222. Additionally, memory device 1118 or equivalent computer-readable medium may be provided in connection with the at least one processor for storing the program instructions or code.

It is noted that the various illustrative logics, logical blocks, modules, and circuits described in connection with the disclosed examples may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or processes of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed examples is provided to enable any person skilled in the art to make or use the presently disclosed methods and apparatus. Various modifications to these disclosed examples may be readily apparent to those skilled in the art, and the generic principles defined herein may be applied to other examples (e.g., in an instant messaging service or any general wireless data communication applications) without departing from the spirit or scope of the present disclosure. Thus, the present disclosure is not intended to be limited to the examples shown herein, but is to be accorded the widest scope consistent with the principles and novel features disclosed herein. The word "exemplary" is used exclusively herein to mean "serving as an example, instance, or illustration." Any example described herein as "exemplary" is not necessarily to be construed as preferred or advantageous over other examples.

Accordingly, while examples of a communication system having transmitter identification have been illustrated and described herein, it will be appreciated that various changes can be made to the examples without departing from their spirit or essential characteristics.

We claim:

1. A method for communicating transmitter identification in an interlace structure of a communication network system using positioning pilot channels (PPC), comprising:

a) encoding pilot information on a first portion of a plurality of subcarriers in a positioning pilot channel symbol for an active transmitter; and b) encoding transmitter identification information on a second portion of a plurality of subcarriers of the symbol;

wherein the first portion of the plurality of subcarriers comprises at least first and second interlaces and the second portion of the plurality of subcarriers comprises at least a third interlace;

said pilot information is scrambled in the first interlace with a wide area identifier and scrambled in the at least second interlaces with the wide area identifier and a local area identifier; and wherein at least one of said interlace includes said transmitter identification information in the form of one or more transmitter location coordinates in a free interlace.

2. The method of claim 1, wherein the transmitter identification information is encoded in at least the third interlace.

3. The method of claim 1, wherein said interlace structure is grouped into eight interlaces.

4. The method of claim 3, wherein said transmitter location coordinates are longitude, latitude and or altitude coordinates.

5. The method of claim 4, wherein said transmitter location coordinates of longitude, latitude and or altitude are in interlace 3.

6. The method of claim 5, wherein interlace 3 also includes network delay information.

7. The method of claim 6, wherein a fixed bit PPC packet length of 80 bits is used to provide 10 blocks of 8 bits each, with each 8 bits converted to 100 bits.

8. The method of claim 7, wherein said 80 bit PPC packet is allocated as option:

| Field | #bits | |
|---|---|---|
| Packet Type | 2 | TxID or Other Parameters |
| Latitude | 23 | 0.125 second resolution |
| Longitude | 24 | 0.125 second resolution |
| Altitude | 10 | 4 m resolution |
| Network Delay | 11 | In micro-seconds |
| Allocation | 3 | |
| CRC | 7. | |

9. The method of claim 7, wherein said 80 bit PPC packet is allocated as option:

| Field | #bits | |
|---|---|---|
| Packet Type | 2 | TxID or Other Parameters |
| Transmitter ID | 18 | |
| Reserved | 50 | Additional bits to match packet size |
| Allocation | 3 | |
| CRC | 7. | |

10. The method of claim 8, wherein said packet type further includes parameters of transmitter power and frame number.

11. The method of claim 9, wherein said packet type further includes parameters of transmitter power and frame number.

12. The method as defined in claim 1, wherein the encoding of transmitter identification information includes:

interleaving information bits of the transmitter identification information:

encoding the bits using a predetermined encoding scheme;

manipulating the encoded bits to ensure number of bits matches a predetermined modulation scheme;

modulating the bits according to the predetermined modulation scheme; and mapping the modulated bits to subcarriers in the second portion of the plurality of subcarriers of the symbol.

13. The method of claim 12, wherein the predetermined encoding scheme comprises Reed-Muller encoding.

14. The method of claim 12, wherein manipulating the encoded bits includes puncturing one or more encoded bits and replacing the punctured encoded bits with zero values.

15. The method of claim 12, wherein the predetermined modulated scheme comprises QPSK modulation.

16. The method of claim 1, wherein the communication system comprises an OFDM communication system.

17. An apparatus for communicating transmitter identification in an interlace structure of a communication network system using positioning pilot channels (PPC) comprising:

a) a first module configured to encode pilot information on a first portion of a plurality of subcarriers in a positioning pilot channel symbol for an active transmitter; and b) a second module implemented by a processor and configured to encode transmitter identification information on a second portion of a plurality of subcarriers of the symbol;

wherein the first portion of the plurality of subcarriers comprises at least first and second interlaces and the second portion of the plurality of subcarriers comprises at least a third interlace;

said pilot information is scrambled in the first interlace with a wide area identifier and scrambled in the at least second interlaces with the wide area identifier and a local area identifier; and wherein at least one of said interlace includes said transmitter identification information in the form of one or more transmitter location coordinates in a free interlace.

18. The apparatus of claim 17, wherein the first portion of the plurality of subcarriers comprises at least first and second interlaces and the second portion of the plurality of subcarriers comprises at least a third interlace.

19. The apparatus of claim 17, wherein said interlace structure is grouped into eight interlaces.

20. The apparatus of claim 17, wherein said transmitter location coordinates of longitude, latitude and or altitude are in interlace 3.

21. The apparatus of claim 20, wherein interlace 3 also includes network delay information.

22. The apparatus of claim 21, wherein a fixed bit PPC packet length of 80 bits is included to provide 10 blocks of 8 bits each, with each 8 bits converted to 100 bits.

23. The apparatus of claim 22, wherein said 80 bit PPC packet is allocated as option:

| Field | #bits | |
|---|---|---|
| Packet Type | 2 | TxID or Other Parameters |
| Latitude | 23 | 0.125 second resolution |
| Longitude | 24 | 0.125 second resolution |
| Altitude | 10 | 4 m resolution |
| Network Delay | 11 | In micro-seconds |
| Allocation | 3 | |
| CRC | 7. | |

24. The apparatus of claim 22, wherein said 80 bit PPC packet is allocated as option:

| Field | #bits | |
|---|---|---|
| Packet Type | 2 | TxID or Other Parameters |
| Transmitter ID | 18 | |
| Reserved | 50 | Additional bits to match packet size |
| Allocation | 3 | |
| CRC | 7. | |

25. A computer program product, comprising:

a non-transitory computer-readable medium encoded with computer program codes, the computer program codes comprising:

code for causing a computer to encode pilot information on a first portion of a plurality of subcarriers in a positioning pilot channel symbol for an active transmitter; and code for causing a computer to encode transmitter identification information on a second portion of a plurality of subcarriers of the symbol;

wherein the first portion of the plurality of subcarriers comprises at least first and second interlaces and the second portion of the plurality of subcarriers comprises at least a third interlace;

said pilot information comprises code for causing a computer to scramble in the first interlace with a wide area identifier and code for causing a computer scrambling in the at least second interlaces with the wide area identifier and a local area identifier; and wherein at least one of said interlace includes code for causing a computer to encode said transmitter identification information in the form of one or more transmitter location coordinates in a free interlace.

26. The computer program product of claim 25, wherein the transmitter identification information is encoded in at least the third interlace.

27. The computer program product of claim 25, wherein the transmitter identification information includes at least one of a transmitter identification field, a transmitter allocation field, and cyclic redundancy check bits.

28. The computer product of claim 27, wherein the transmitter allocation field is configured to communicate whether subsequent symbols including further data will be transmitted.

29. The computer program product of claim 25, wherein the computer readable medium further comprises code for causing a computer to transmit transmitter allocation data within the transmitter identification information indicating the allocation of one or more subsequent symbols for a transmitter specific channel used to communicate further data.

30. The computer program product of claim 25, wherein the computer readable medium further comprises:

code for interleaving information bits of the transmitter identification information;

code for encoding the bits using a predetermined encoding scheme;

code for manipulating the encoded bits to ensure number of bits matches a predetermined modulation scheme;

code for modulating the bits according to the predetermined modulation scheme; and code for mapping the modulating bits to subcarriers in the second portion of the plurality of subcarriers of the symbol.

31. The computer program product of claim 30, wherein the predetermined encoding scheme comprises Reed-Muller encoding.

32. The computer program product of claim 30, wherein the code for manipulating the encoded bits further includes code for puncturing one or more encoded bits and replacing the punctured encoding bits with zero values.

33. The computer program product of claim 30, wherein the predetermined modulation scheme comprises QPSK modulation.

34. The computer product of claim 25, wherein the communication system comprises an OFDM communication system.

35. A non-transitory computer readable media embodying computer program codes that when executed by a computer, perform a method for communicating transmitter identification in an interlace structure of a communication network system using positioning pilot channels (PPC), the method comprising:

a) encoding pilot information on a first portion of a plurality of subcarriers in a positioning pilot channel symbol for an active transmitter; and b) encoding transmitter identification information on a second portion of a plurality of subcarriers of the symbol;

wherein the first portion of the plurality of subcarriers comprises at least first and second interlaces and the second portion of the plurality of subcarriers comprises at least a third interlace;

said pilot information is scrambled in the first interlace with a wide area identifier and scrambled in the at least second interlaces with the wide area identifier and a local area identifier; and wherein at least one of said interlace includes said transmitter identification information in the form of one or more transmitter location coordinates in a free interlace.

36. The non-transitory computer readable media of claim 35, wherein the transmitter identification information is encoded in at least the third interlace.

37. The non-transitory computer readable media of claim 35, wherein said interlace structure is grouped into eight interlaces.

38. The non-transitory computer readable media of claim 37, wherein said transmitter location coordinates are longitude, latitude and or altitude coordinates.

39. The non-transitory computer readable media of claim 38, wherein said transmitter location coordinates of longitude, latitude and or altitude are in interlace 3.

40. The non-transitory computer readable media of claim 39, wherein interlace 3 also includes network delay information.

41. The non-transitory computer readable media of claim 40, wherein a fixed bit PPC packet length of 80 bits is used to provide 10 blocks of 8 bits each, with each 8 bits converted to 100 bits.

42. The non-transitory computer readable media of claim 41, wherein said 80 bit PPC packet is allocated as option:

| Field | #bits | |
|---|---|---|
| Packet Type | 2 | TxID or Other Parameters |
| Latitude | 23 | 0.125 second resolution |
| Longitude | 24 | 0.125 second resolution |
| Altitude | 10 | 4 m resolution |
| Network Delay | 11 | In micro-seconds |
| Allocation | 3 | |
| CRC | 7. | |

43. The non-transitory computer readable media of claim 41, wherein said 80 bit PPC packet is allocated as option:

| Field | #bits | |
|---|---|---|
| Packet Type | 2 | TxID or Other Parameters |
| Transmitter ID | 18 | |
| Reserved | 50 | Additional bits to match packet size |
| Allocation | 3 | |
| CRC | 7. | |

* * * * *